Figure 1:
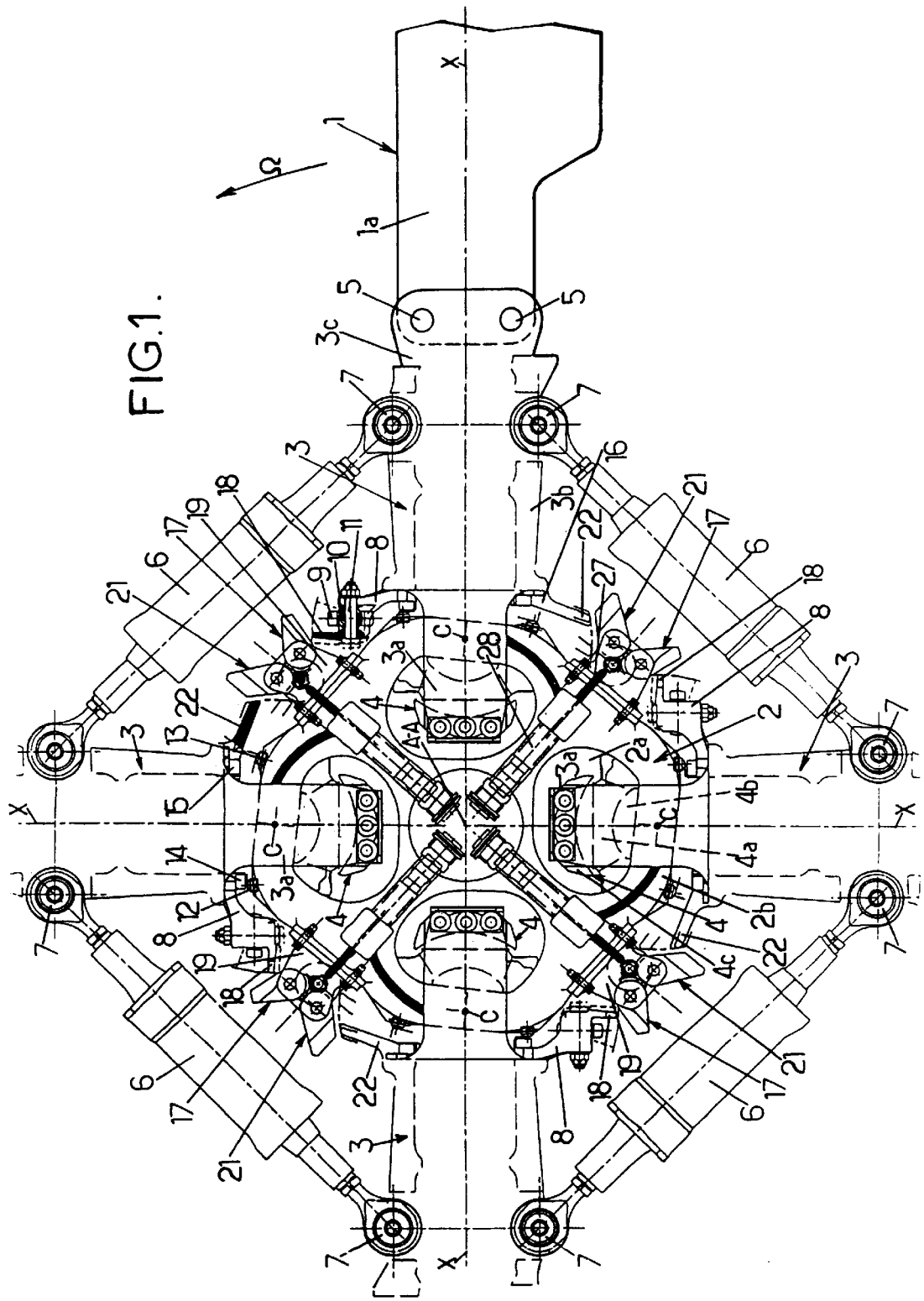

United States Patent
Mondet et al.

[11] Patent Number: 5,951,251
[45] Date of Patent: Sep. 14, 1999

[54] DEVICE FOR LOCKING THE BLADES OF A ROTOR, AT LEAST IN TERMS OF PITCH

[75] Inventors: Jean Joseph Henri Mondet, Pelissanne; Jean-Luc Michel Leman, Aix-en-Provence, both of France

[73] Assignee: Eurocopter, Marignane Cedex, France

[21] Appl. No.: 08/891,072

[22] Filed: Jul. 10, 1997

[30] Foreign Application Priority Data

Jul. 12, 1996 [FR] France .................................. 96 08746

[51] Int. Cl.⁶ .................................................. B64C 27/51
[52] U.S. Cl. ...................... 416/107; 416/140; 416/134 A
[58] Field of Search .................................. 416/106, 107, 416/134 A, 140, 141, 153

[56] References Cited

U.S. PATENT DOCUMENTS

| 2,614,640 | 10/1952 | Buivid | 416/140 |
| 3,343,610 | 9/1967 | Vacca et al. | 416/153 |
| 4,284,387 | 8/1981 | Ferris | 416/141 |
| 4,551,067 | 11/1985 | Caramaschi et al. | 416/140 |
| 4,915,585 | 4/1990 | Guimbal | 416/140 |
| 5,007,799 | 4/1991 | Mouille et al. | 416/140 |
| 5,116,209 | 5/1992 | Anglade et al. | 416/107 |

FOREIGN PATENT DOCUMENTS

| 0 057 053 | 1/1982 | European Pat. Off. |
| 0 600 797 | 12/1993 | European Pat. Off. |

*Primary Examiner*—Christopher Verdier
*Attorney, Agent, or Firm*—Henderson & Sturm

[57] ABSTRACT

The locking device comprises, for each blade, at least one first subassembly with a fork for locking a finger, one of the fork and finger pivoting on a chassis attached laterally to the hub between the linking members of two neighboring blades, the other element being fixed to the linking member and projecting laterally towards the other linking member so that the pivoting element can be moved between a position in which it is engaged over the finger for locking the blade at least in terms of pitch, and a disengaged position for unlocking.

38 Claims, 16 Drawing Sheets

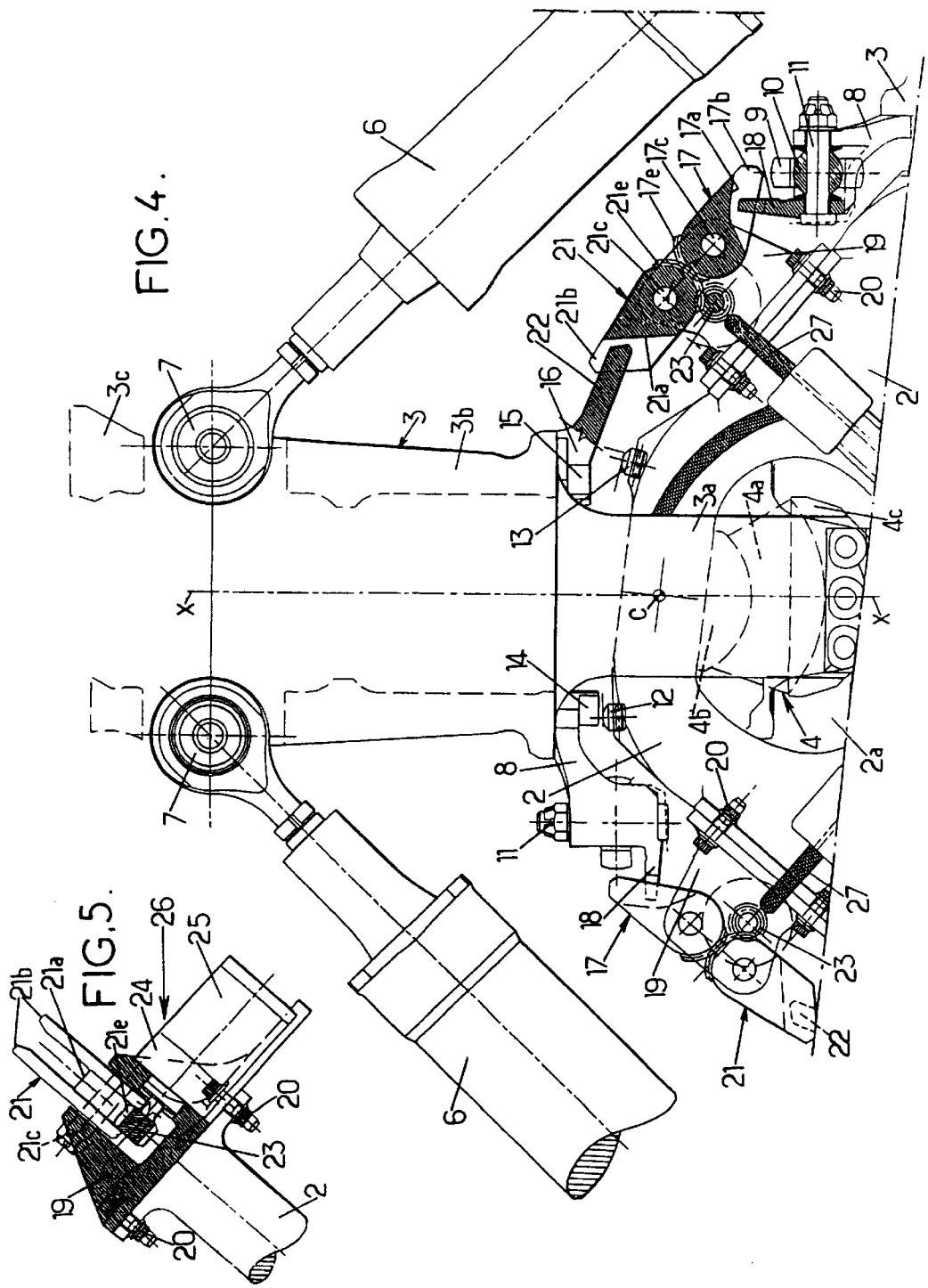

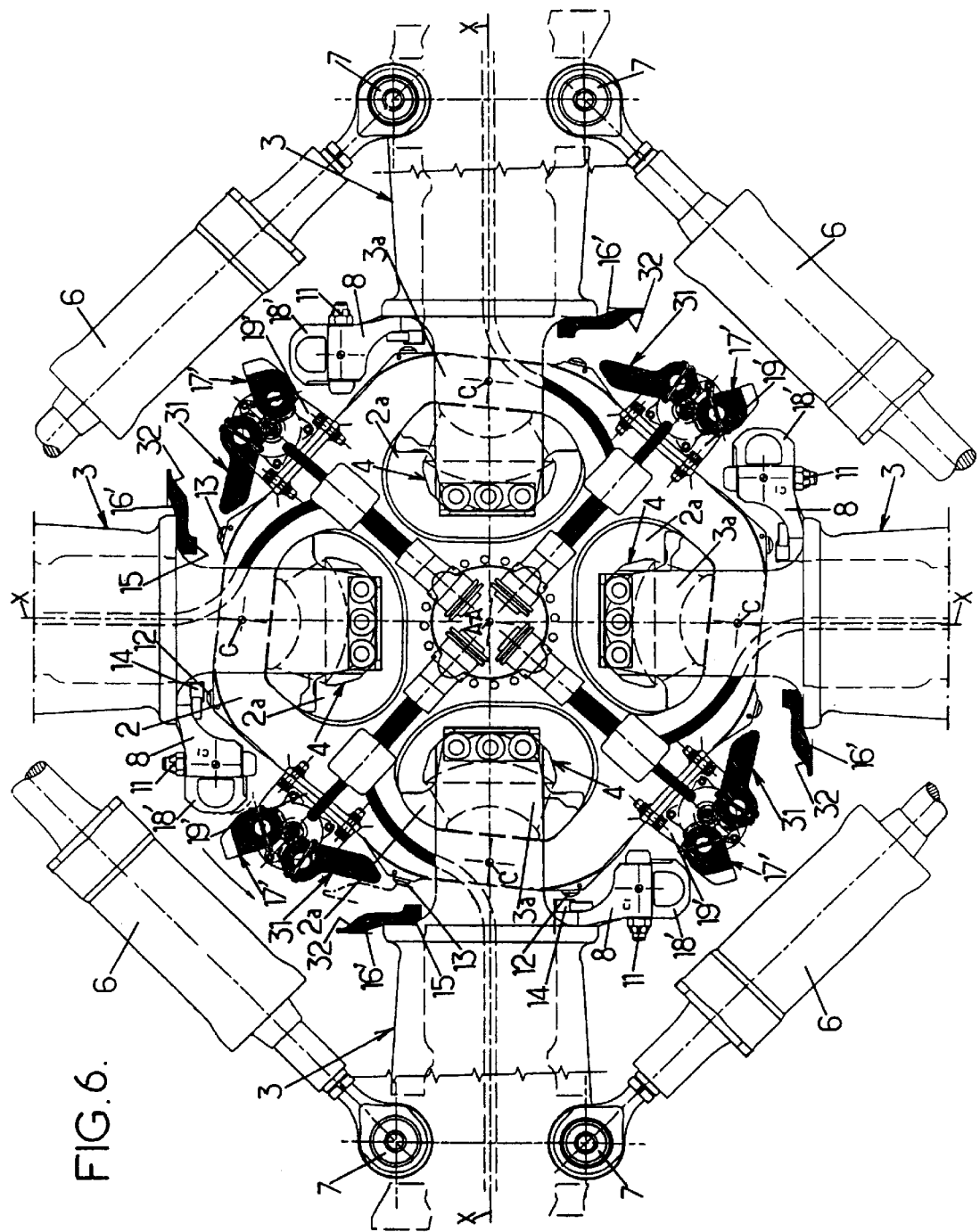

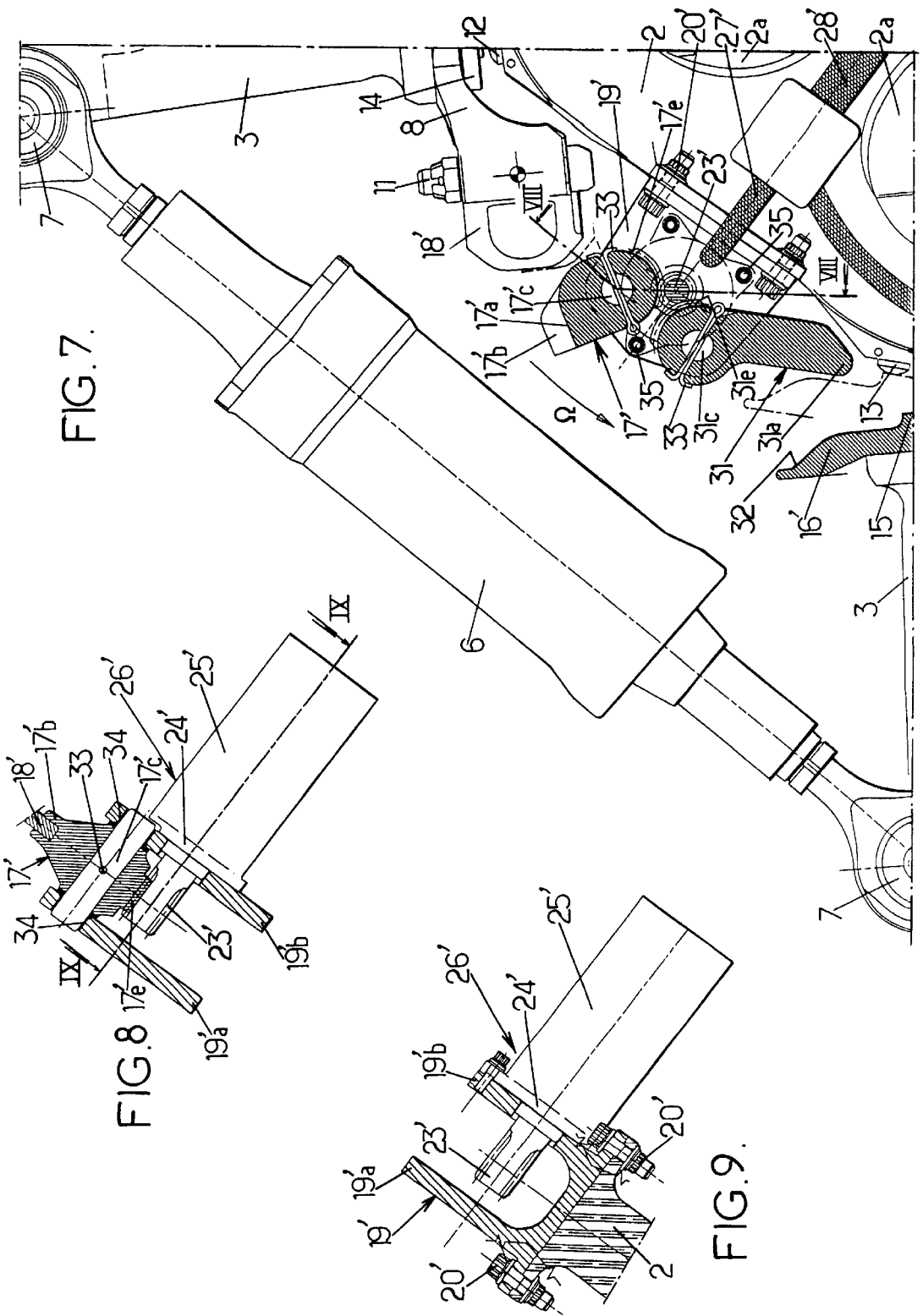

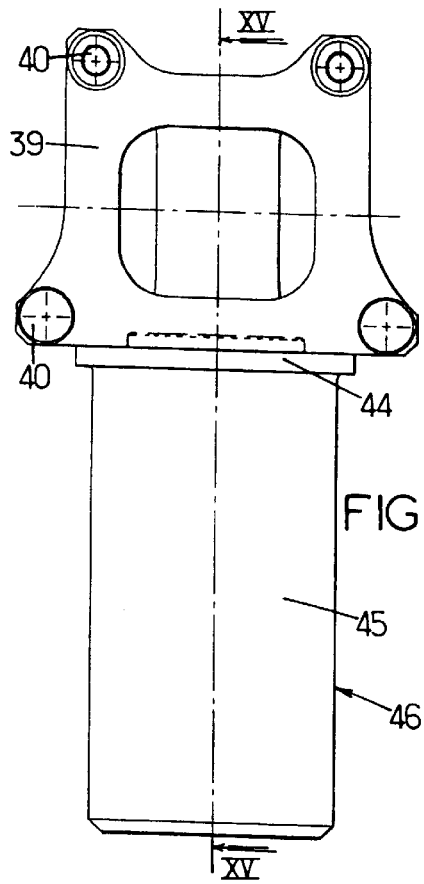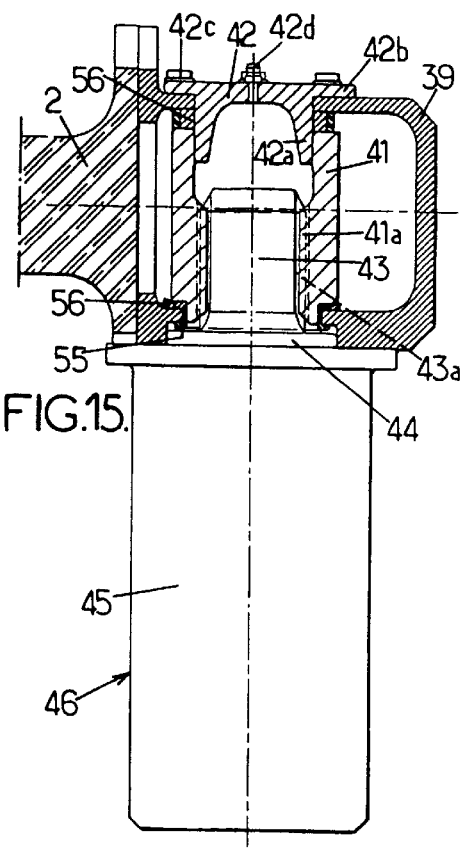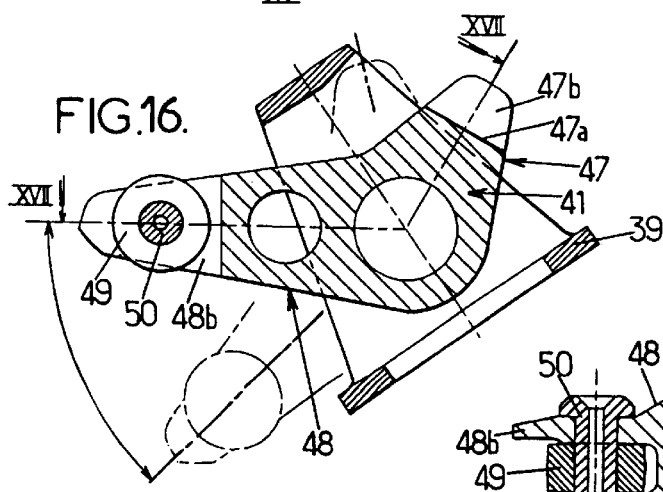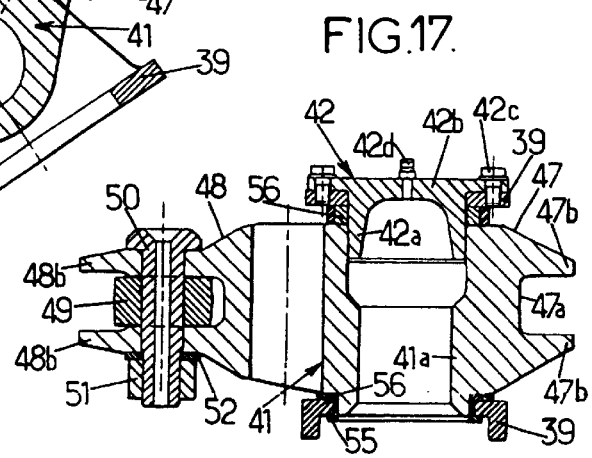

DEVICE FOR LOCKING THE BLADES OF A ROTOR, AT LEAST IN TERMS OF PITCH

The invention relates to a device for locking the blades of a rotor craft, at least in terms of pitch, and deals more specifically with a device of this kind which allows the blades of a helicopter rotor, particularly a main rotor, to be locked or restrained not only in terms of pitch but preferably also in terms of drag and even, generally with some clearance, in terms of flapping.

The locking device of the invention, which shall be understood to mean a device for locking or restraining movement, is more particularly intended to be fitted to a rotor in which each blade can be folded, by pivoting, possibly controlled by an operating actuator, about an axle of folding situated at the outer radial end, with respect to the axis of the rotor, of a member that links the blade to the hub, so as to reduce the amount of space occupied by the rotor, and therefore by the helicopter, on a parking area, in a hangar and/or on the deck of a ship in the case of carrier-borne helicopters.

It is known that in such helicopters with folding blades, the rotors of which are of the type comprising:

- a hub intended to be driven in rotation about an axis of the rotor,
- at least two blades, each of which is connected to the hub by a linking member which is roughly radial with respect to the axis of the rotor and itself connected to the hub by retaining and articulating means, the linking member being secured to the corresponding blade, with which it constitutes an oscillating mass, in its angular movements in pitch, flap and drag, locking the blades at least in terms of pitch is of capital importance for the correct folding and deployment of each blade. This is because as the blade is being folded, the centre of gravity of the oscillating mass, formed by this blade and the member which links it to the hub, is shifted from a position radially outside the centre of articulation of the means of retaining and articulating the linking member on the hub and on the longitudinal pitch-change axis of the oscillating mass (which passes through this centre of articulation) to a position radially inside (with respect to the rotor axis) this centre of articulation and offset laterally with respect to the longitudinal pitch-change axis of the oscillating mass, which means that the oscillating mass tends to tilt about its pitch-change axis if this oscillating mass is not locked in terms of pitch. Likewise, during folding or deployment and/or while the blade is folded, gusts of wind and/or movements of the carrier ship may cause the oscillating masses to move in terms of flap and/or in terms of drag which may prove damaging to some of the components of the rotors and possibly dangerous to maintenance crew.

EP-A-57 053 describes a helicopter rotor of the type outlined above and equipped, on the one hand, with a motorized device for folding each blade of the rotor and, on the other hand, with a device for locking each blade in terms of pitch, drag and flapping.

This locking device comprises, for each blade, at least one first subassembly with a fork for locking a finger, in which subassembly the two elements that are the finger and the fork are, on the one hand, one mounted on the hub and the other mounted on the corresponding linking member and, on the other hand, able to move with respect to each other and be moved from one of two positions to the other, one of these positions being a position in which the finger is engaged in the fork to lock said oscillating mass, at least in terms of pitch, and the other being a position in which the finger is disengaged from the fork to allow the movements of said oscillating mass, at least in terms of pitch.

More specifically, in each of the two subassemblies with fork and finger that this device includes for each blade, which subassemblies are symmetric with each other with respect to the plane in which the rotor rotates, the vertical finger, which projects above or below the corresponding linking member, is translated radially across the linking member towards the inside to be locked in a respective one of two forks open radially towards the outside and fixed on an arm of the hub, to which the linking member is articulated by a laminated spherical stop.

However, the fingers are moved against a return spring by, on the one hand, a link rod of a hinge joint which is articulated between a folding actuator, mounted on the member for linking the blade to the hub, and a folding fitting pivoting on the linking member and secured to the blade and, on the other hand, a lever pivoting on said fitting via a cam which rotates with the blade about the axle of folding in a mechanism for immobilizing/mobilizing and for folding the blade and fitting onto the linking member articulated to a corresponding arm of the hub.

Such a locking device has the drawback of being controlled by a motorized folding device, and therefore of being unable to operate independently of this device. Furthermore, this locking device has most of its components mounted on the corresponding linking member, the drawback of this being that it makes this linking member heavier and more complicated to produce.

The problem underlying the invention is that of overcoming the drawbacks of the locking device known from EP-A-57 053, and in particular of providing a locking device, which locks at least in terms of pitch, which is independent of a folding device, has a relatively simple, economical and reliable structure, does not add bulk to the linking member and remains easily accessible for maintenance operations.

In general terms, one object of the invention is to provide a device for locking the blades of a rotor, at least in terms of pitch, which is better suited than the known devices to the various requirements of practice.

Thus the locking device according to the invention, which is of the type known from EP-A-57 053 and is outlined hereinabove, is characterized in that said first subassembly is arranged roughly laterally with respect to the hub, between the linking members of two adjacent blades of the rotor, one of the two elements of said first subassembly being fixed to the linking member of a first of the two adjacent blades so that it projects roughly laterally from one side of said linking member which points roughly towards the linking member of the second of the two adjacent blades, and the other element of said first subassembly being mounted so that it can rotate with respect to the hub about a rotation axle about which said other element pivots from one of said disengaged and engaged positions to the other.

The spaces available around the hub and between two adjacent linking members may thus be used for mounting subassemblies with fork and locking finger, which can have a simple and reliable readily accessible robust structure and which can operate independently of a folding actuator so that the device of the invention can also be fitted to rotors with non-folding blades or with blades which are folded by hand.

To simplify the production of the linking member and make mounting easier, while at the same time giving the device a favorable configuration, the element fixed to the linking member of the first blade is secured to a pitch lever and/or support for a drag stop of this first blade, this pitch lever and/or support of drag stop being attached to this linking member. For its part, and for the same reasons, the element that can rotate with respect to the hub is advantageously mounted so that it can pivot about its rotation axle roughly parallel to the rotor axis on a chassis attached laterally to the periphery of the hub.

Although it is possible to fix the fork to the linking member and make the finger pivot between the disengaged and engaged positions, in order selectively to lock or restrain the blade in terms of pitch by positive engagement of the finger in the fork, the element fixed to the linking member of the first blade is advantageously the finger of said first subassembly, and the element that can rotate with respect to the hub is the fork of this first subassembly, in order not to overload the linking member unnecessarily.

In order to avoid any risk of inadvertent pivoting of the rotary member, when the blade does not need to be locked in terms of pitch, and/or in order to keep the finger engaged in the fork in the position in which the blade is locked in terms of pitch throughout the time spent folding, held in the folded position, and deployed, the locking device advantageously comprises a device for immobilizing the rotary element in the position in which the finger is either engaged in and/or disengaged from the fork of said first subassembly.

Thus an economical version of the locking device is obtained and offers the capability for the finger to be locked manually in the fork in a simple mechanism for immobilizing the oscillating mass in terms of pitch.

However, for a rotor in which the folding of the blades is motorized, it is advantageous for the locking device additionally to comprise at least one reversible actuator which rotates as one with the hub and is connected by a transmission system to the rotary element of at least one first subassembly, and preferably interacting with an end-of-travel immobilizing device of said rotary element, for the reasons outlined above. Thus all of the blades can be locked in terms of pitch using a single actuator suitably connected to the rotary element of at least one first subassembly of each blade.

Advantageously however, for reasons of reliability, and to save having to have a complicated and bulky transmission system on the hub, the device comprises reversible actuators of which there are the same number as there are blades of the rotor, and each of which is fixed roughly laterally to the periphery of the hub between the linking members of two adjacent blades of the rotor, and drives the rotation of at least said rotary element of a first subassembly with fork and finger which is arranged between said linking members of the two adjacent blades. Thus each actuator can be fitted as close as possible to the rotary element of the first subassembly the rotation of which it controls. For this, each actuator is advantageously mounted on said chassis attached laterally on the periphery of the hub and on which said rotary element of the first subassembly arranged between said two adjacent blades is mounted so that it can rotate, said actuator including an output member, such as a pinion, driving the rotation of the rotary element with respect to the hub, in a simple and compact assembly.

To avoid loading the retaining and articulating means from just one side of the locking device on the linking member of each blade, as well as for better use of the spaces available between the linking members of each pair of adjacent blades so as to improve the effectiveness of the locking device, this device advantageously also comprises, between the linking members of said adjacent first and second blades of the rotor, and laterally with respect to the hub, a second subassembly with two elements which can move with respect to each other, and of which one is fixed to the linking member of said second blade so as to project roughly laterally from that side of this linking member which points roughly towards said first blade and of which the other can rotate with respect to the hub and pivots about a rotation axle between two positions, one of which is a position close to and interacting with the element fixed to the linking member of said second blade and the other a position separated from this element. Depending on its structure, and as explained below, a second subassembly of this kind may, in conjunction with the first subassembly, supplement the locking of each blade in terms of pitch or even restrict the flapping of the blade to a small flapping clearance needed to avoid any damage, if the clearances between the two elements of each of the two subassemblies about the flapping axis are small, or alternatively lock or restrain a blade in terms of drag also, at least on one side of its longitudinal pitch-change axis.

In these various cases, and by analogy with the first subassembly, the element of the second subassembly which is fixed to the linking member of the second blade is advantageously an element secured to a support of a drag stop and/or pitch lever of said second blade, this support and/or pitch lever being attached to said linking member of this second blade. Likewise, the rotary element of the second subassembly is advantageously an element mounted so that it can pivot about its rotation axle roughly parallel to the axis of the rotor on a chassis attached laterally to the periphery of the hub, this chassis advantageously being the one on which the rotary element of the first subassembly is mounted so that it can pivot and on which one of the actuators of the device is also mounted, thus controlling an action of simultaneously locking each of the two blades between which it is arranged.

Thus when the locking device comprises, between two adjacent blades of the rotor, a first and a second subassembly according to the invention, it is advantageous for the rotary elements of the first subassembly and of the second subassembly, these subassemblies being arranged between the linking members of the two same adjacent blades, to be linked in terms of rotation, so that they can simultaneously and respectively be in positions engaging with and close by and interacting with, or disengaged and separated from the corresponding elements fixed on said linking members in order simultaneously to lock or unlock said blades.

In this case, each of the two rotary elements may be driven in rotation directly off one and the same actuator, or just one may be driven in rotation by an actuator and in turn drive the rotation of the other. In a simple structure, suitable to both the aforementioned drive arrangements, each rotary element may comprise a hub which is at least partially toothed, driven in rotation by an output pinion of a reduction gearbox of a reversible electric motor/gearbox unit of a rotary operating actuator.

For each blade to be locked or restricted as much as possible in terms of pitch and, possibly, restricted in terms of flapping on each side of its longitudinal pitch-change axis, the second subassembly may comprise a second fork for locking or retaining a second finger, in which case the closeby and interacting position and the separated position are positions in which the second finger is respectively engaged in and disengaged from the second fork, the element of said second subassembly which is fixed to the linking member of said second blade being the second finger, and the rotary element of the second subassembly being the second fork. Thus between the linking members of two adjacent blades, two pivoting forks are obtained, each of which positively engages with a respective one of two fingers fixed to said linking members in order to lock the blades in terms of pitch. As regards the blade drag, the fork of a first and/or, as appropriate, of a second subassembly may have a bottom between two pitch stops which are roughly mutually parallel and spaced apart along the rotation axle of said rotary element of said subassembly so that in the position of engagement with a corresponding finger, said finger defines with said bottom a working drag clearance for at least one blade of the rotor which drag clearance is roughly at right angles to said rotation axle and to a longitudinal pitch-change axis of the corresponding oscillating mass and/or said finger defines, with said pitch stops, a working flap clearance for at least one corresponding blade, said flap clearance being roughly parallel to said rotation axle.

Advantageously, the rotary element of a first and/or, as appropriate, of a second subassembly moves respectively from said position in which it is disengaged or separated from into said position in which it is engaged in or close to and interacting with a corresponding element fixed to a linking member by pivoting in the radial direction from the outside inwards and towards the hub, and in the circumferential direction with respect to the axis of the rotor towards said linking member, so that centrifugal force can be used, when the rotor is turning, to keep the rotary member, such as a fork, of the first and/or of the second subassembly in a position in which it is disengaged from the other element, such as the corresponding finger fixed to the linking member.

However, according to a second embodiment, it is also possible for the rotary element of the second subassembly to be a push-rod finger which, in the position in which it is close to and interacting with said element fixed to the linking member of said second blade, is in contact via its free end with said element in order to lock said second blade in terms of drag in the direction pointing towards the first blade. In this case, it is advantageous for said push-rod finger to move from said position separated from the element fixed to the linking member of the second blade into said interacting position in which it pushes this element back, pivoting roughly from the inside outwards and in a radial direction with respect to the axis of the rotor, this direction of movement making it possible to contrive that in the position for locking in terms of drag, the push-rod finger is no longer subject to torque but merely to compression. Thus it is contrived that each blade, on one side of its pitch-change axis, is locked in terms of pitch and, on the other side of this axis, is locked in terms of drag towards the neighboring blade situated on this other side.

However, in order also to provide locking in terms of drag on the first side of each blade it is advantageous for the fork of the corresponding first subassembly to include a bottom set out as a drag stop track to be roughly in contact with said finger of said first subassembly in the position in which said fork is engaged over said finger so as to lock said first blade in terms of drag on the side pointing towards said second blade.

Furthermore, for it to be possible for the push-rod finger also to play a part in locking said second blade in terms of pitch, said element of said second subassembly which is fixed to the linking member of said second blade is preferably also a fork, the bottom of which is set out as a drag stop track pushed back by the push-rod finger in the position in which it interacts with the latter, and which extends between two pitch stops of said fork, so as simultaneously to lock said second blade in terms of pitch and lock it in terms of drag towards said first blade. In this configuration, each blade is therefore locked in terms of pitch and drag on each of its two opposite sides corresponding roughly to the front and to the rear of the corresponding linking member, with respect to the direction of rotation of the rotor.

According to another embodiment, the rotary elements of the first and second subassemblies may be advantageously mounted so that they can pivot about one and the same rotation axle, and, in this case, even be secured to one another. In an advantageously simple embodiment, these rotary elements therefore each consist of a respective one of the two arms of a cranked lever pivoting at its crank on said chassis attached to the hub.

In this case, to lock each blade in terms of pitch and drag with the assistance of the flight drag stops normally provided on the hub and the linking members, it is advantageous for said cranked lever to include a first arm set out as a fork constituting the rotary element of the first subassembly and interacting with said finger fixed on the linking member of the first of said adjacent blades to lock it in terms of pitch, the second arm of the cranked lever, which is longer than the first arm, carrying a pushing roller interacting with a drag stop track of the linking member of said second blade to push back said track which constitutes the element of said second subassembly which is fixed to the linking member of said second blade so as to press a drag stop of said linking member against a drag stop of the hub in order to lock said second blade in terms of drag.

The pushing roller is advantageously a rotating roller, preferably with rolling bodies such as needles or rolling elements, mounted so that it can rotate on said second arm about an axle which is roughly parallel to the axle about which the cranked lever rotates, and the cranked lever may be set out as a double pivoting fork, with a second arm set out as a second fork with two pitch stops spaced apart and between which said pushing roller is mounted so that it can rotate, said drag stop track engaging in said second fork in the position in which said drag stop track interacts with said roller so as to lock said second blade also in terms of pitch.

To make the guidance and the rotational drive of the cranked lever easier, it is advantageous for this lever, which is in the form of a double fork, to be centered and guided in rotation in a bearing for taking up loading, this bearing itself being centered and clamped on said chassis attached to the hub, and for the cranked lever to have, at its cranked part, a bore with straight and cylindrical internal splines via which said lever is driven in rotation by said output member which consists of straight and cylindrical external splines on an output shaft of said reduction gearbox of said actuator, said bearing for guiding and centering the cranked lever advantageously being equipped with a grease nipple for lubricating said splines.

In order to improve the interaction between at least one of the elements of the first and second subassemblies which are fixed to the linking members of the two adjacent blades, on the one hand, and, on the other hand, the two pitch stops of the first or of the second fork of the cranked lever, said element fixed to one of the linking members, namely a finger or a drag stop track interacting with one of the forks, supports two buffer blocks each facing a respective one of said two pitch stops of this fork.

Each buffer block has advantageously a buffer surface in the form of a spherical cap facing a flat contact surface of the corresponding pitch stop on said first or second fork, and, in a simple way, the two blocks are in contact with said element which bears them around an aperture made in this element and through which the two blocks are screwed together, each of the two buffer blocks preferably also being captive and connected by a locking wire preventing it from becoming unscrewed to that one of the elements which bears it.

Figure 2:
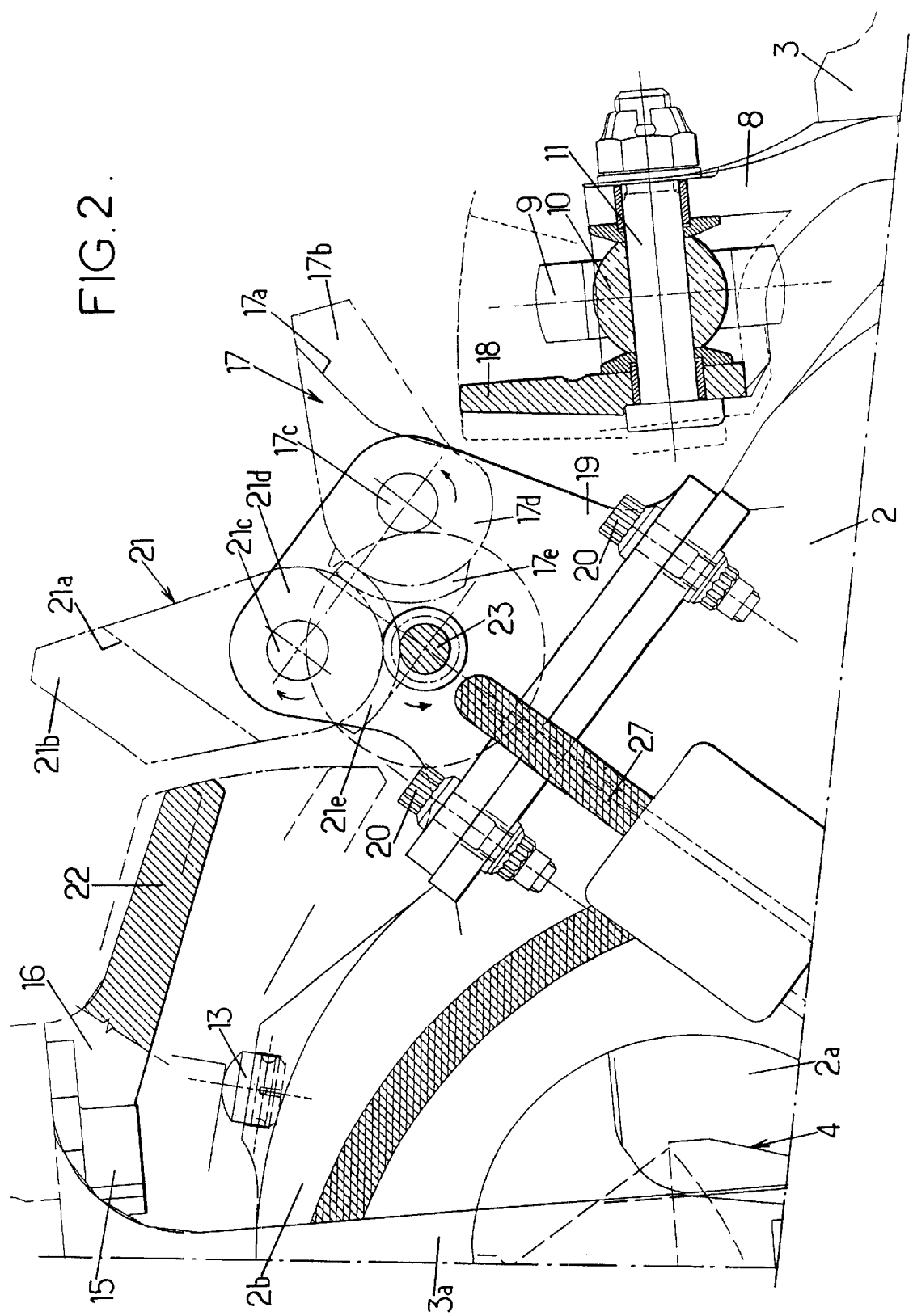
Figure 3:
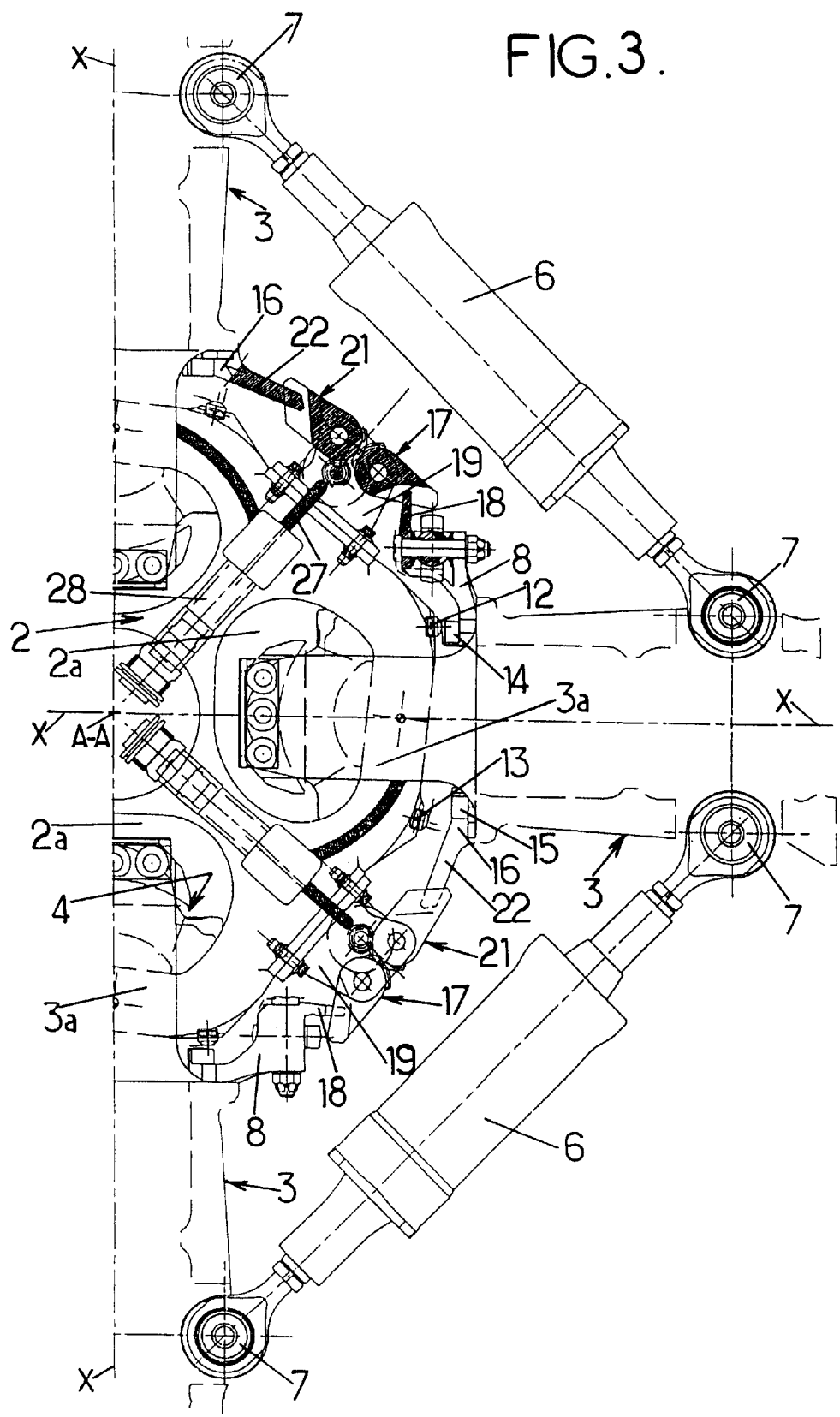
Figure 10:
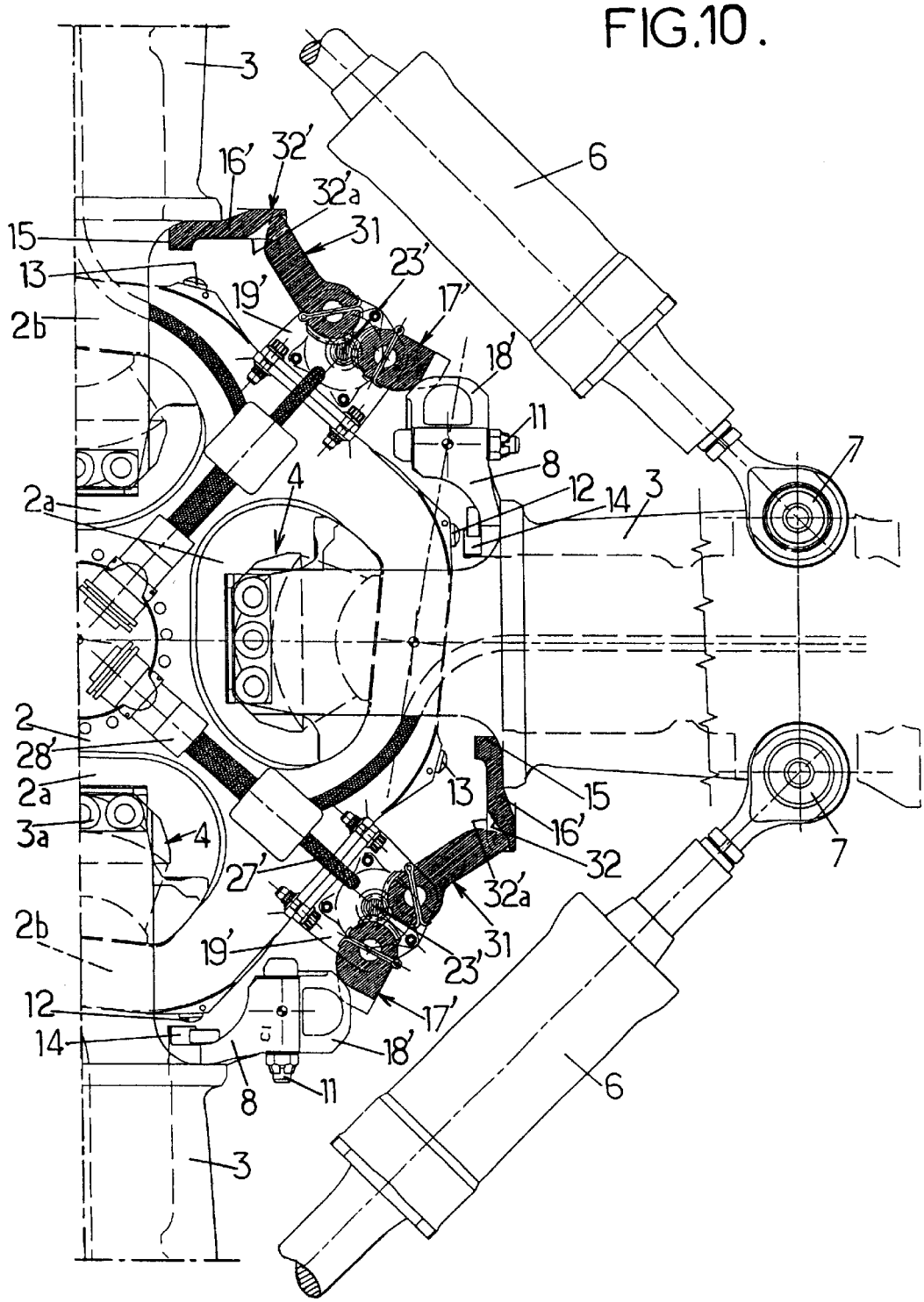
Figure 11:
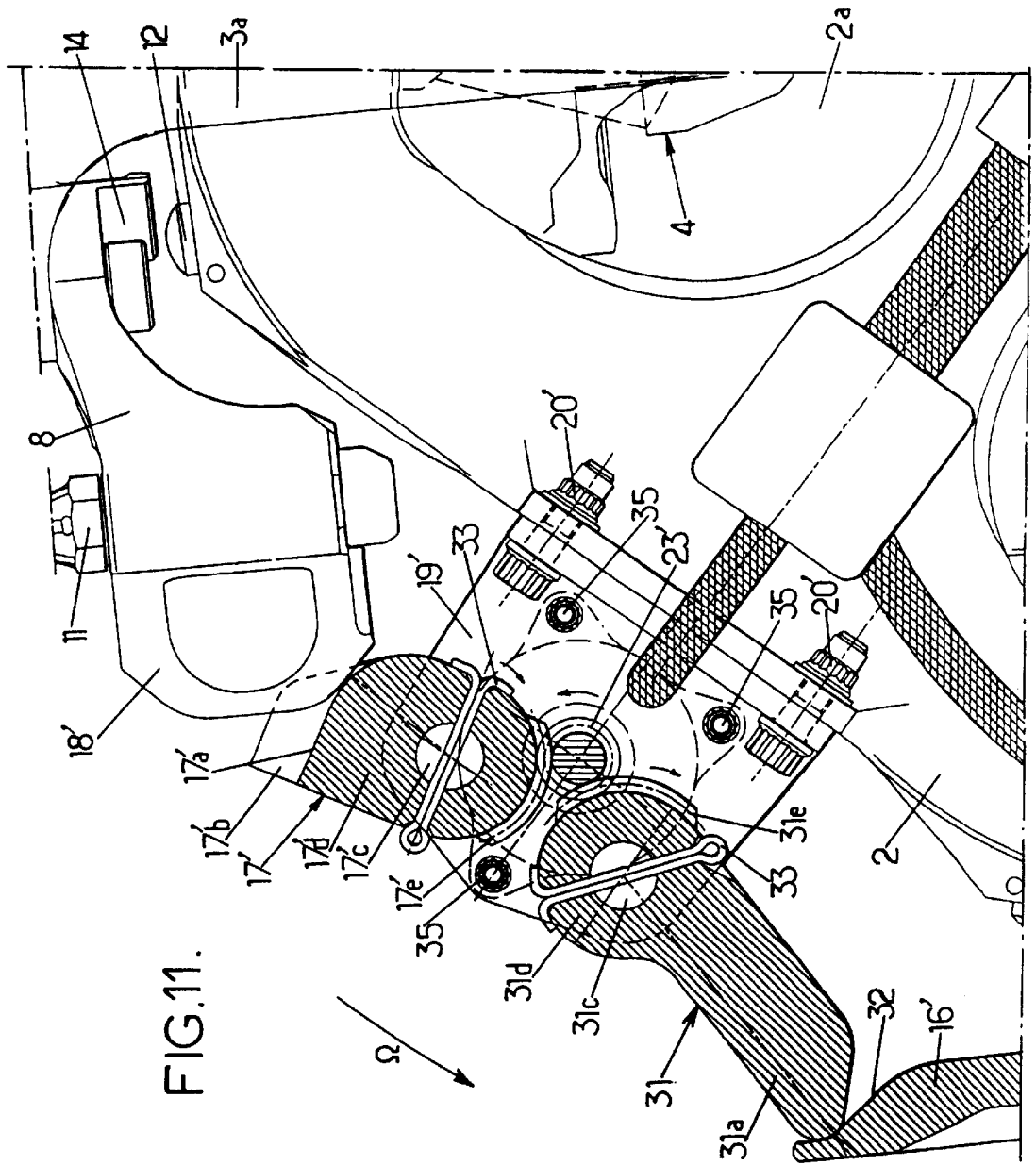
Figure 12:
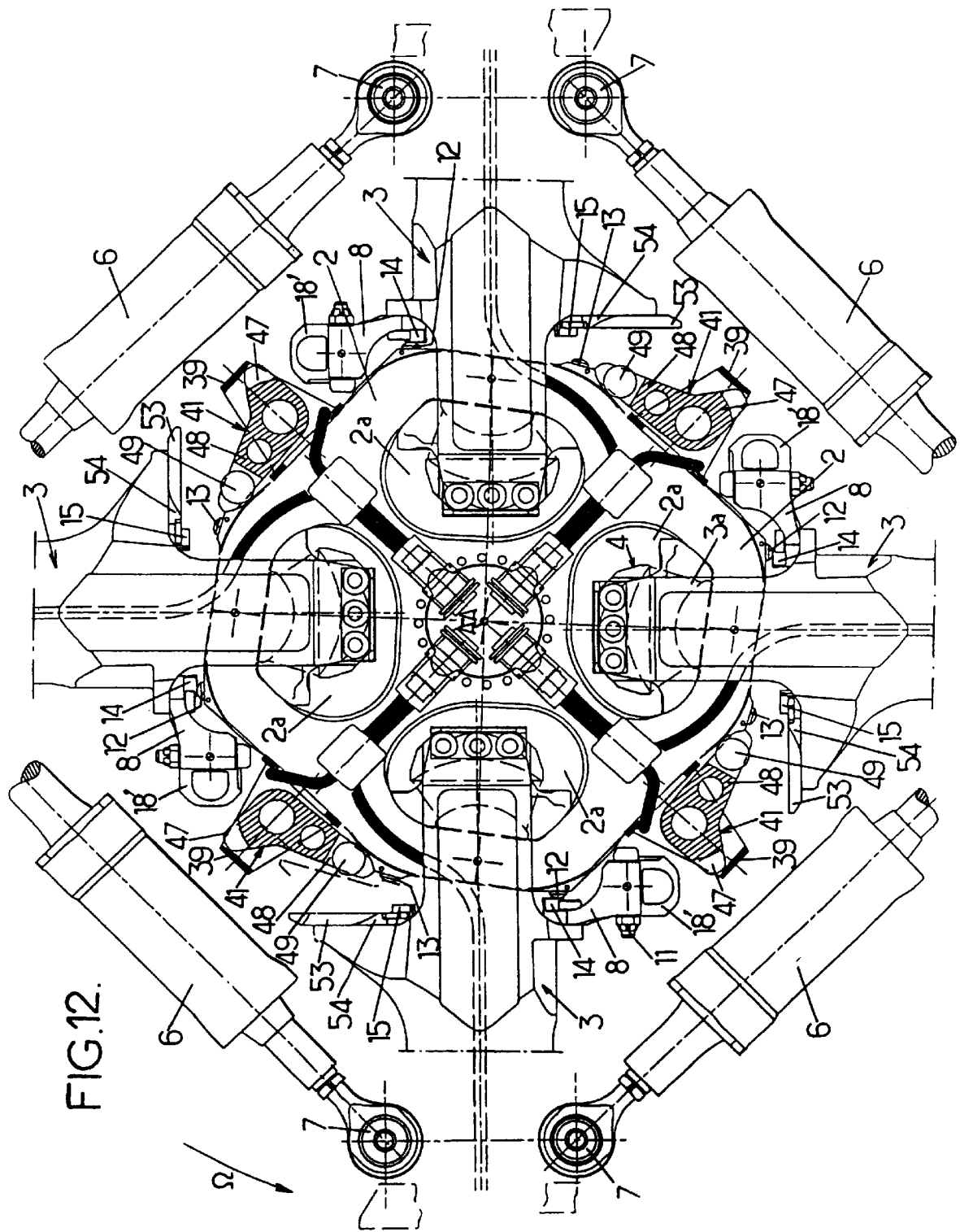
Figure 13:
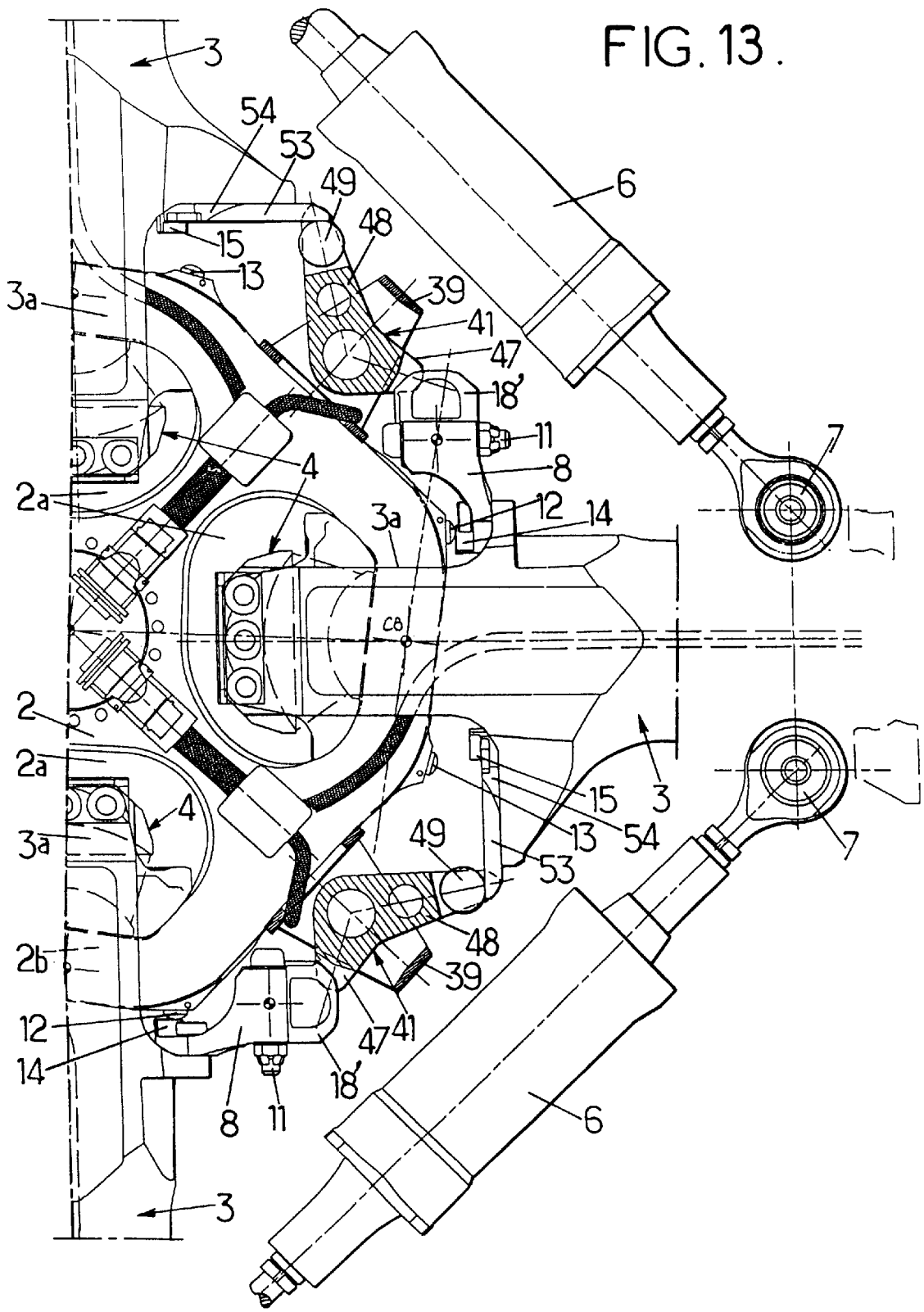
Figure 18:
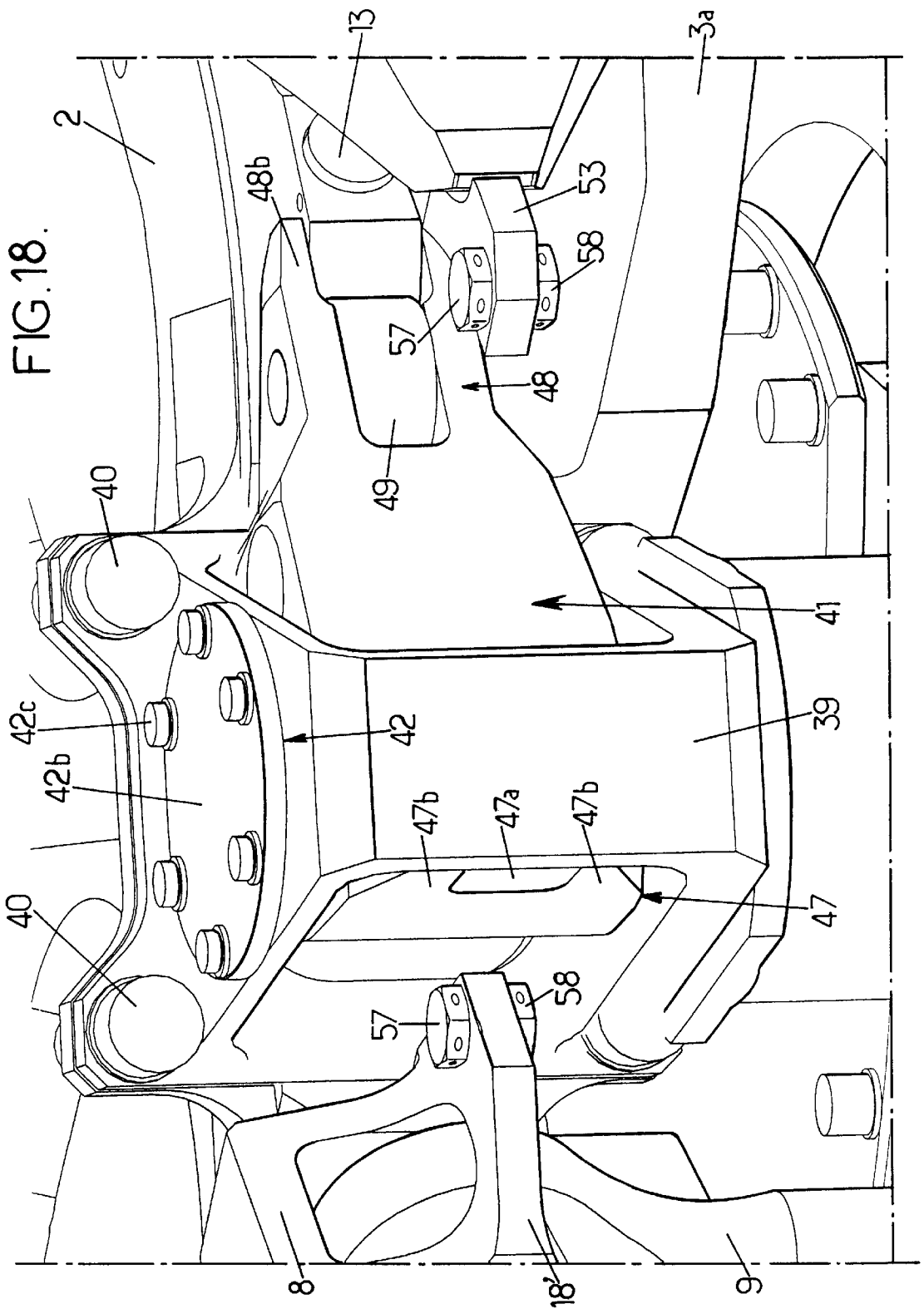
Figure 19:
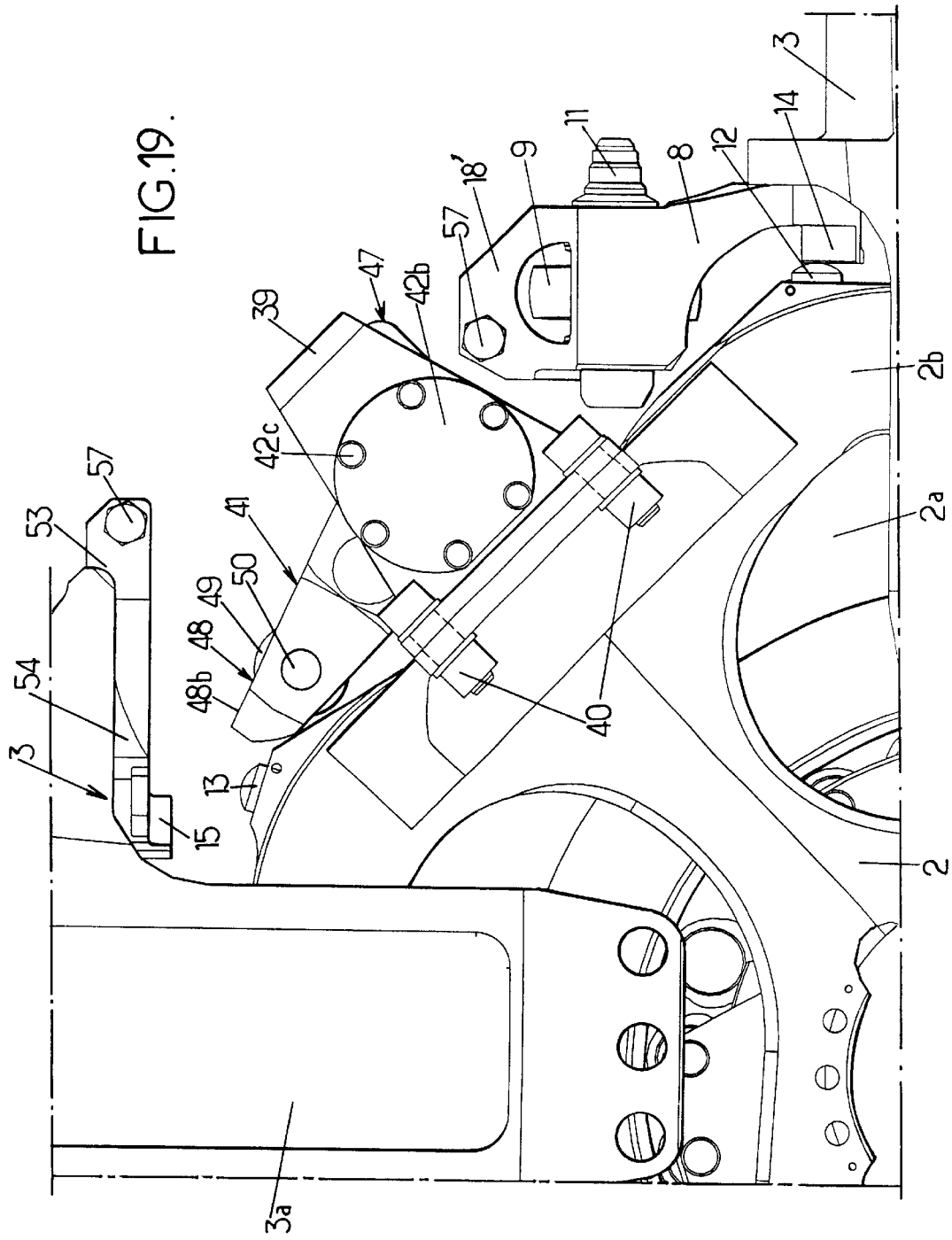
Figure 20:
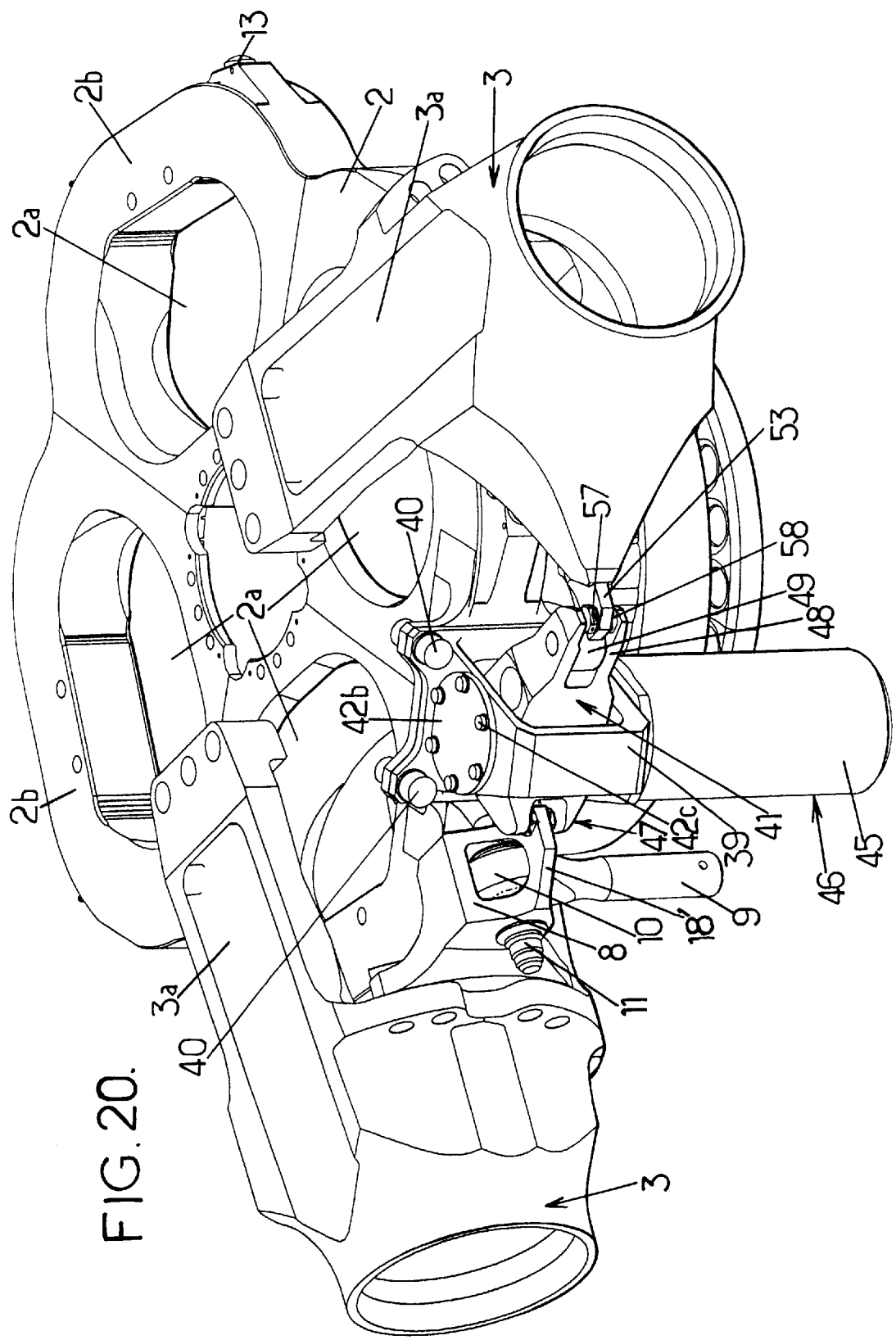
Figure 21:
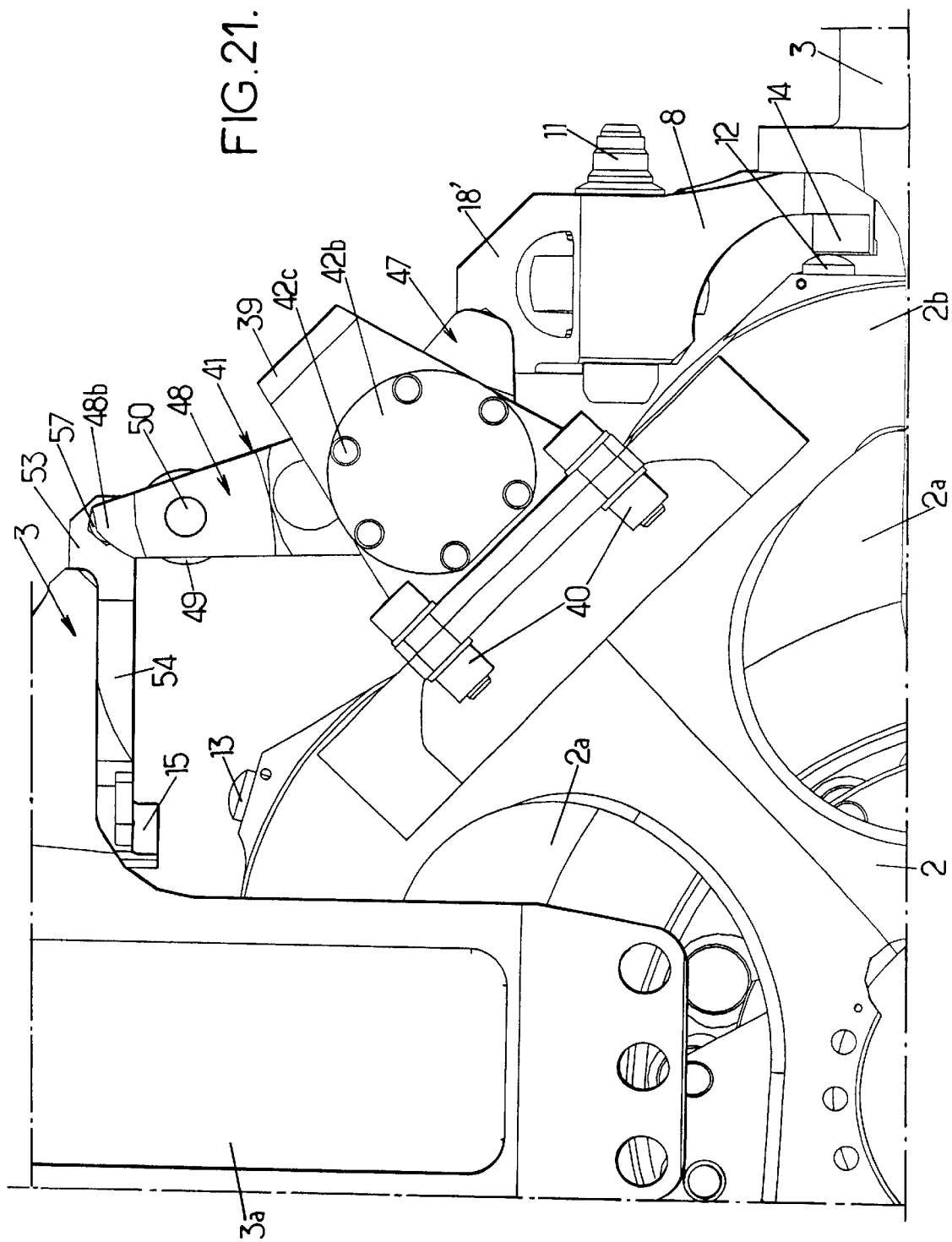
Figure 22:
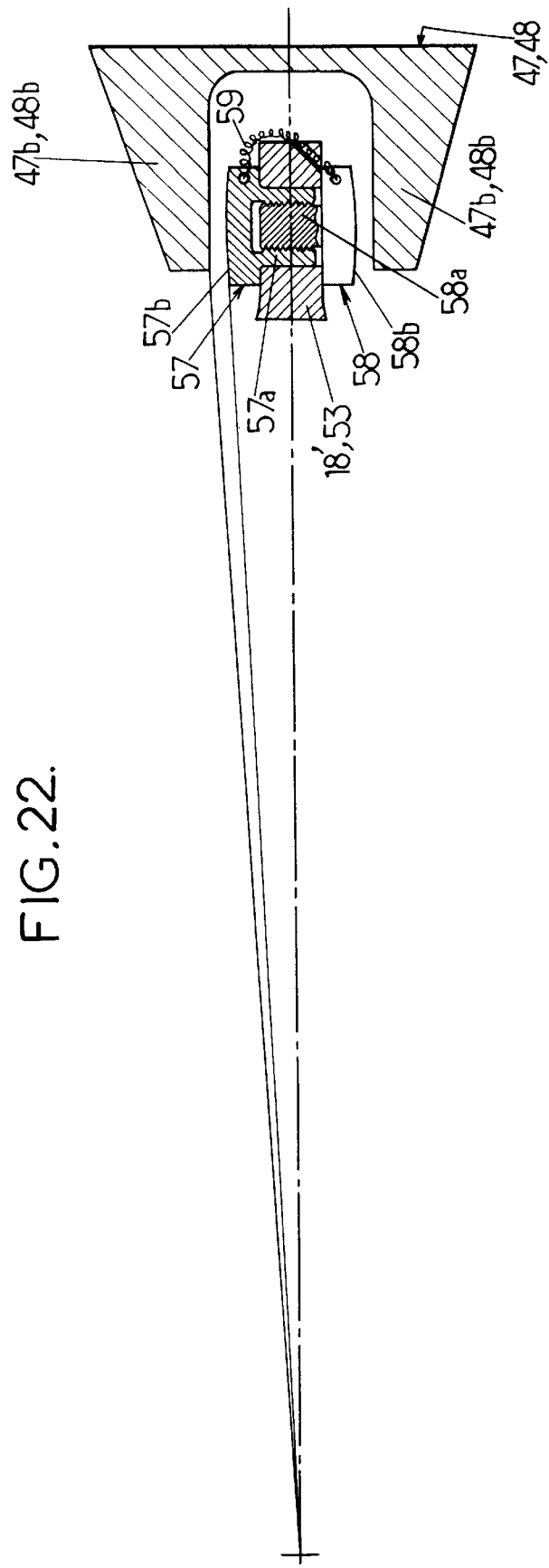

The invention will be better understood and other advantages and features of the invention will emerge from the description given below by way of non-limiting example of some embodiments which are described with reference to the appended drawings in which:

FIG. 1 is a partial diagrammatic view, partly in section and partly in plan view, of a four-bladed rotor head, with just one blade represented for simplicity, and equipped with a first example of a pitch locking device, the device being in the unlocked position for flight, FIG. 2 is a diagrammatic view on a larger scale, partly in section and partly in plan, of a detail of FIG. 1, FIG. 3 is a half view analogous with FIG. 1 of the same rotor head in which the pitch locking device is in the locking position, such as it would occupy during the folding of the blades, for example, FIG. 4 is a view on a larger scale of a detail of FIG. 3, FIG. 5 is a diagrammatic view partly in section and partly in side elevation of the device of FIG. 4, FIG. 6 is a view analogous with FIG. 1 for a second example of a device, which provides locking in terms of pitch and in terms of drag (pitch and drag locking device), FIG. 7 is a view analogous with FIG. 2 for the example of FIG. 6, FIG. 8 is a section on VIII—VIII of FIG. 7, FIG. 9 is a section on IX—IX of FIG. 8, FIG. 10 is a view analogous with FIG. 3 for the example of FIG. 6, FIG. 11 is a view analogous with FIG. 4 for the example of FIG. 6, FIG. 12 is a view analogous with FIG. 1 for a third example of a device, FIG. 13 is a view analogous with FIG. 3 for the example of FIG. 12, FIG. 14 is a view in side elevation of an actuator with its chassis for linking to the hub of the example of FIG. 12, FIG. 15 is a section on XV—XV of FIG. 14, FIG. 16 is a diagrammatic view partially in plan and partly in section of the device of FIGS. 14 and 15 representing the double-fork cranked lever depicted in solid line in the locking position, and depicted partially in chain line in the unlocked position, FIG. 17 is a section on XVII—XVII of FIG. 16, FIG. 18 is a partial perspective view roughly from the side of a device according to FIGS. 14 to 17 in the example of FIGS. 12 and 13, FIG. 19 is a plan view of the device of FIG. 18, FIG. 20 is a perspective view of a rotor head of the example of FIGS. 12 to 19 with a locking mechanism restricted to those of its components which are arranged between two linking members of two adjacent blades of the hub, FIG. 21 is a plan view corresponding to FIG. 19 but in the position for locking the cranked lever, and FIG. 22 is a diagrammatic view partially in section and partly in side elevation representing one of the forks of the double-fork cranked lever and the buffer blocks on the corresponding element fixed to a member for linking a blade to the hub in the corresponding first or second subassembly.

FIGS. 1 to 4 represent diagrammatically, partly in plan view and partly in section, a helicopter four-bladed main rotor head, in which each blade 1 is connected to the hub 2 of the rotor by a linking member 3 which is roughly radial with respect to the axis A—A of the rotor. In this example, the hub 2 which is intended to be driven in rotation about the rotor axis A—A (at the centre of the rotor in FIGS. 1 and 3) is a hub in the form of a plate with cavities which, for each blade 1, has an axial cavity 2a in which means 4 for retaining and articulating the corresponding linking member 3 to the hub 2 are housed. In this example, these articulating and retaining means 4 comprise a laminated spherical stop a central part 4a of which consists of an alternating stack of rigid cups and of elastically deformable layers in the form of spherical caps. The central stack 4a is bonded to a rigid outer radial armature 4b fixed by any known means, for example bolting, to the edge 2b of the hub 2 which closes the corresponding cavity 2a radially on the outside, whereas towards the axis A—A of the rotor, the central stack 4a is bonded to an inner radial armature 4c fixed like a spacer piece in the cavity 2a between the two branches of an inner radial clevis 3a presented by the corresponding linking member 3, which branches extend, in a known way, one above and the other below the plate of the hub 2 without contacting it. The linking member 3, which for the remainder of the description will be known as a cuff, because its central part 3b is tubular, possibly for housing an actuator for the automatic folding of the corresponding blade, also has an outer radial clevis 3c, between the two branches of which the root 1a of the corresponding blade 1 is held, for example by two bushings 5 which are parallel to one another and one on each side of the common longitudinal axis which is the pitch-change axis X—X of the blade 1 and of the corresponding cuff 3. One of the bushings 5 may, for example, be removable to allow the blade 1 to be folded with respect to the cuff 3 by pivoting about the other bushing 5, or alternatively folding is obtained by a folding fitting (not represented) to which the blade root 1a is secured and which is itself mounted so that it can pivot about an axle such as one of the two bushings on the outer radial end of the cuff 3 under the control of an operating actuator which may be housed in the tubular central part 3b of the cuff 3.

Using this well-known method of mounting, the cuff 3 is secured to the corresponding blade 1 with which it constitutes an oscillating mass in its angular pitch movements (about the common longitudinal axis X—X), and drag and flapping movements about a drag axis and a flapping axis respectively, which axes meet the axis X—X at the centre C of the laminated spherical stop 4, this centre C being situated in the corresponding edge 2b of the hub 2, the drag axis passing through (C and being roughly parallel to the rotor axis A—A, and the flapping axis being roughly perpendicular to the drag axis and to the axis X—X. The drag movements of the blades 1 are damped by inter-blade drag dampers 6 each of which is articulated, by means of a ball joint 7, by each of its two ends respectively, to the cuff 3 of each respective one of the two blades 1 between which this damper 6 is mounted.

Also in a known way, the pitch of each blade 1 is controlled using a pitch lever 8 which is attached by bolting near to the bottom of the inner clevis 3a of the corresponding cuff 3, on one side of its pitch axis X—X, for example on the leading-edge side of the blade 1 and of its cuff 3, this pitch lever 8 having a free end set out as a clevis in which, as represented more clearly in FIGS. 2 and 4, one end of a pitch-control rod 9 is held by a ball joint 10 about a bolted axle 11 fixed in the branches of the clevis at the end of the lever 8. As an alternative, it is the corresponding end of the pitch rod 9 which may be set out as a clevis in which the end of the pitch lever 8 is held by a ball joint around a bolted axle fixed in the clevis.

The drag movements of each blade 1 during flight are limited by two drag stops 12 and 13 fixed to the hub 2, projecting roughly radially outwards from the outer face of the corresponding edge 2b of the hub 2 and each of which interacts with a respective one of the drag stops 14 and 15 mounted opposite them on the cuff 3, on each side of its longitudinal axis X—X, one 14 for example being fixed on the pitch lever 8 close to its connection with the cuff 3, and the other 15 being fixed on a drag stop support 16 which is itself attached, preferably by bolting, to the cuff 3 on the opposite side to the lever 8 with respect to the axis X—X, that is to say on the trailing edge side of the blade 1 and its cuff 3.

If the direction of rotation of the rotor is the direction of the arrow Ω in FIG. 1, then forward drag of each blade 1 is restrained by the drag stop 14 of the cuff 3 coming into contact with the drag stop 12 of the hub 2, whereas its backwards drag is restrained by the drag stop 15 of the cuff 3 coming into contact with the drag stop 13 of the hub 2 as the oscillating mass pivots in terms of drag about the centre C of the corresponding laminated spherical stop 4.

To lock the blades 1 in terms of pitch about their axis X—X when the rotor is stationary, in the "ground" position, the rotor head is equipped with a device for locking the pitch which comprises, between the two cuffs 3 of each pair of neighboring blades 1, two subassemblies arranged laterally with respect to the hub 2, each of which comprises a rotary fork for locking a respective one of two fingers each fixed so that it projects laterally from a respective one of the two cuffs 3 and pointing substantially towards the other cuff 3.

More specifically, between each pair of adjacent cuffs 3, and as clearly represented in FIGS. 2 and 4, the locking device comprises a first subassembly with a first rotary fork 17 and a first finger or projection 18. This finger 18 is held on the pitch lever 8 attached laterally to one of the two cuffs 3 in question so that it projects towards the other cuff 3, the finger 18 being fixed around the end closest to the hub 2 on the bolted axle 11 used to hold the ball joint 10 that articulates the pitch-control rod 9 on the lever 8, and in such a way that this finger 18 itself projects laterally with respect to the lever 8 roughly towards the other cuff 3. The finger 18 thus points towards the bottom 17a delimited on the fork 17 between two flat pitch stops 17b thereof, which are parallel and spaced apart in the direction of the rotation axle 17c which is itself parallel to the axis of the rotor A—A and about which the fork 17 is mounted so that it can pivot via its hub 17d which is partially toothed at 17e on a chassis 19 fixed by four bolts 20 against the outer lateral face of the hub 2.

Similarly, the second subassembly also comprises a second rotary fork 21 for locking a finger or projection 22, this finger 22 being secured to the support 16 for the drag stop 15, and such that when this support 16 is laterally attached to the second cuff 3 of the considered pair of cuffs 3, on the side pointing towards the first cuff 3 of this pair, the finger 22 itself projects laterally towards the pitch lever 8 attached to this first cuff 3. The finger 22 thus also points towards the bottom 21a formed on the fork 21 between two flat pitch stops 21b parallel to each other and spaced apart parallel to a rotation axle 21c parallel to the axle 17c but offset laterally from the latter, and about which axle 21c the second fork 21 is mounted so that it can pivot via its hub 21d which also has teeth 21e on part of its periphery, so that its teeth 21e can engage with those 17e on the first fork 17 as well as with those on an output pinion 23 of the reduction gearbox part 24 of a low consumption reversible electric motor/gearbox unit 25 to form an actuator 26 mounted on the lateral chassis 19 on which the second fork 21 is also mounted so that it can rotate in such a way that the actuator 26 is fixed laterally to the hub 2 by the chassis 19 (see FIG. 5).

There are thus obtained two rotary forks 17 and 21 which are mounted so that they can pivot on one and the same chassis 19 which also supports a common actuator 26, one of the forks 17 receiving rotational drive torque from the other 21, which receives drive torque from the output pinion 23 of the actuator 26. These two forks 17 and 21 are driven simultaneously in rotation with respect to the hub 2 about axles 17c and 21c which are parallel to the axis of rotation A—A of the hub 2, while the corresponding fingers 18 and 22, each of which is intended to be engaged positively by a respective one 17 or 21 of the two forks, is secured to a respective one of the two cuffs 3 in their angular excursions in terms of pitch, drag and flapping about the centre C of the laminated spherical ball joint 4 which articulates this cuff 3 to the hub 2.

The two elements 17 and 18 of the first subassembly just like the two elements 21 and 22 of the second subassembly can therefore move with respect to each other, and the two forks 17 and 21 can be moved, with respect to the fingers 18 and 22, from one of two positions to the other, one of which positions (FIGS. 3 and 4) is a position in which the finger 18 or 22 is engaged in the corresponding fork 17 or 21 between the corresponding two pitch stops 17b or 21b to lock the corresponding oscillating masses in terms of pitch, the other position being a position in which the finger 18 or 22 is disengaged from the fork 17 or 21 (see FIGS. 1 and 2) to allow the corresponding oscillating masses to move in terms of pitch (flight position).

In FIG. 2, arrows have been used to indicate the direction of rotation of the output pinion 23, of the fork 21 which is driven radially from the inside outwards and laterally on the side which moves it away from the corresponding finger 22 and of the fork 17 driven by its teeth 17e also radially from the inside outwards and laterally in a direction which moves it away from the corresponding finger 18 as far as a position in which the two forks 21 and 17 are disengaged, for the flight configuration, starting from the engaged position of FIG. 4 which corresponds to a position in which the blades are locked in terms of pitch for folding them, keeping them folded, and deploying them.

In the position of FIG. 2 (flight configuration), the arrangement of the two forks 17 and 21 radially close together towards the outside is advantageous because the forks tend to be held in this position by centrifugal force when the rotor is turning, without unfavorably loading the immobilizing device at the end of its travel, which device is advantageously designed as being incorporated into the actuator 26 and controlled by the power supply therefor. The electric power supply to the motor 25 of the actuator 26 is provided by a lead 27 (see FIGS. 1 and 3) emerging from a radial branch 28 of a wiring harness located on the hub 2 and fed centrally from an electric collector mounted in a rotor mast which drives the rotation of the hub 2.

Of course, to pass from the disengaged position (FIG. 2) to the engaged position (FIG. 4), all that is required is for the polarity of the power supply to the motor 25 of the actuator 26 to be reversed so that the output pinion 23 drives the fork 21 which itself drives the fork 17 in the opposite directions of rotation to those indicated in FIG. 2.

In the device of FIGS. 1 to 5, the four blades 1 of the rotor are locked in terms of pitch by four actuators 26 each one acting on two adjacent blades 1 and their cuffs 3 via a mechanism fitted directly with the corresponding actuator 26 laterally with respect to the hub 2 and between the two cuffs 3, this mechanism comprising two subassemblies with fork 17 or 21 for the locking of a finger 18 or 22. Thus each actuator 26 using one and the same mechanism simultaneously locks in terms of pitch the pitch lever 8 of a cuff 3 and the support 16 for the drag stop 15 of an adjacent cuff 3 on the hub. The oscillating masses, each of which consists of a blade 1 and its associated cuff 3, are preset to the pitch required for folding, either by the pilot or by folding-management software, when this operation takes place automatically using a suitably controlled folding actuator. The rotation of the electric motor 25 of the actuator 26 in one direction, via the reduction gearbox part 24 and the output pinion 23 drives the forks 17 and 21 apart starting from the unlocked position of FIGS. 1 and 2 so that the forks 17 and 21 are pivoted respectively towards the receiving fingers 18 and 22 secured to the two neighboring oscillating masses until the forks 17 and 21 positively engage these fingers 18 and 22. Starting from the engaged position thus obtained (FIGS. 3 and 4), reversing the direction of rotation of the motor of the actuator 26 will cause the forks 17 and 21 to disengage from the fingers 18 and 22 to unlock the blades in terms of pitch.

Using end-of-travel contacts, not represented, controlling the immobilizing and mobilizing of the actuator 26, positive locking or immobilization is achieved so that any risk of the forks 17 and 21 separating from their unlocked position of FIGS. 1 and 2 is avoided, outside of the folding phase, and therefore for configurations in which the rotor is rotating on the ground and in flight. Likewise, positive locking or immobilization ensures that the forks 17 and 21 are kept in the position in which they are engaged over the fingers 18 and 22 throughout the time spent folding, held in the folded position, and deploying.

As regards the transmission of loadings originating from the oscillating masses, when stressed in terms of pitch, these loadings are taken up by the forks 17 and 21 then pass through the bearings by means of which these forks 17 and 21 are mounted on the common chassis 19 in such a way that they can rotate and are absorbed by the hub 2. For loadings in terms of flapping, the two pitch stops 17b and 21b of the forks 17 and 21 respectively are separated from one another, parallel to the rotation axle 17c or 21c by a distance which is such that with the corresponding finger 18 or 22 it defines a working flap clearance parallel to the rotor axis and which allows the flapping stresses from the oscillating masses to be taken up by a device (not represented) comprising anti-cone stops and droop-restrainer stops, the clearance of which is smaller than that defined by the forks 17 and 21 with the fingers 18 and 22. This clearance makes it possible for the flapping loadings not to be absorbed by the forks 17 and 21, because these loadings would be prohibitive and destructive on these components, bearing in mind the ratios of lever arms involved in flapping, because the fingers 18 and 22 are close to the axes of flapping. However, as an alternative, when these ratios of lever arms for flapping are less unfavorable, that is to say when the fingers 18 and 22 are sufficiently offset from the flapping axis for these loadings to be transmitted, the flapping stresses may also be taken up by the forks 17 and 21, the bearings in which they rotate on the chassis 19, and therefore be absorbed by the hub 2, in an embodiment in which the pitch stops 17b and 21b can restrict the flapping.

For stresses in terms of drag, in the position in which the forks 17 and 21 are engaged over the fingers 18 and 22 (see FIGS. 3 and 4), the fingers 18 and 22 define, with the bottoms 17a and 21a respectively of the forks 17 and 21 a working drag clearance which is roughly at right angles both to the rotor axis A—A and to the corresponding pitch axis X—X, and which is larger than the clearance defined elsewhere in terms of drag by another ground drag stops device (not represented) of conventional structure possibly coupled to the anti-cone stops and droop-restrainer stops device, so that the stresses in terms of drag are not taken up by the forks 17 and 21 and the bearings in which they rotate on the chassis 19.

As regards the link between the chassis 19 and the hub 2, it is also possible, in place of the four bolts 20, to employ nuts held captive in a composite strap laterally surrounding the hub 2 and integrated into it.

FIGS. 6, 7, 10 and 11 represent a four-bladed rotor head which is very similar to the one in FIGS. 1 to 4, which means that the same numerical references are used to denote the same components. This rotor head is equipped with a second example of a locking device, the parts of which are also visible in FIGS. 8 and 9, and which can be distinguished from the previous example described with reference to FIGS. 1 to 5 in that it not only provides locking in terms of pitch but also provides locking and positioning of the blades 1 of the rotor in terms of drag.

Now, in the previous example, clearances necessary for flapping and for drag can be defined between the fingers 18 and 22 on the one hand and, on the other hand, the pitch stops 17b and 21b and the bottoms 17a and 21a of the pivoting forks 17 and 21, these clearances being allowed by the actuator 26. However, as a result of these clearances, the overall envelope of the rotor with its folded blades 1 is not as small as it could be.

Furthermore, the mounting of drag dampers 6 between the blades can merely provide a stiffness (that of the laminated spherical stops 4) which is insufficient in the plane of the rotor disc, the consequence of this being the danger of an overall shifting of the folded oscillating masses (1, 3) upon movements of the carrier ship and/or in gusts of wind.

The previous example of a locking device is therefore more suited to a helicopter rotor for which the size of envelope criteria of the rotor with folded blades is not so strict, and also in which the fitting of drag dampers 6 gives a corresponding stiffness in the plane of the rotor, preferably by each drag damper 6 being articulated between a cuff 3 and the hub 2 rather than between two neighboring cuffs 3.

The second example of a locking device which will be described now has to provide locking and positioning in terms of drag, to make it possible to obtain the smallest possible rotor envelope with the folded blades and accommodate for the relatively low stiffness in the plane of the rotor which is the result of the drag dampers 6 being mounted between the blades.

In the second example of FIGS. 6 to 11, we see again, between the two cuffs 3 of each pair of neighboring cuffs 3, a mechanism with two subassemblies each comprising two elements, one of which is fixed to a respective one of the two cuffs 3, by means of a pitch lever 8 or of a support 16' for a drag stop 15 of a cuff 3, and the other element of which can pivot, about an axle which is roughly parallel to the axis of the rotor, on a chassis 19' fixed laterally by four bolts 20' to the hub 2. We also again find that each chassis 19' also, via screws 35, supports an actuator 26' with an electric motor 25' of a motor/gearbox unit with a reduction gearbox part 24' the output shaft 23' of which has axial teeth for transmitting a drive torque to two rotary elements. Finally, we again see that the rotary element of a first subassembly is a pivoting fork 17' engaging on or disengaging from a finger or projection 18' fixed on the pitch lever 8 of a cuff 3 so that it projects laterally towards the other cuff 3 of the pair of cuffs in question, the fork 17' having a bottom 17'a between two pitch stops 17'b between which the finger 18' can be engaged in the position for locking in terms of pitch (FIGS. 10 and 11), the hub 17'd of the fork 17' surrounding its rotation axle 17'c and, on part of its periphery, having teeth 17'e which in this example mesh directly with the toothed output shaft 23' of the actuator 26'.

The main difference compared with the first example is that the rotary element of the second subassembly is a push-rod finger 31 interacting with a drag stop track 32 formed at the end, projecting laterally towards the chassis 19', of a support 16' for the flight drag stop 15 and which is attached laterally to the second of the two cuffs 3 in question and corresponds to the support 16 of the first example.

The push-rod finger 31 comprises a hub 31d surrounding a rotation axle 31c parallel to the rotation axle 17'c and offset laterally from the latter, and the hub 31d has teeth 31e on part of its periphery, these teeth 31e meshing directly with the teeth of the toothed output shaft 23' of the actuator 26'.

Another difference is that the fork 17' and the push-rod finger 31 rotate as one with their respective rotation axle 17'c or 31c on account of two connecting split pins 33, each of which passes diametrically through one of the axles 17'c and 31c and the hub 17'd or 31d surrounding it. Each of the axles 17'c and 31c is mounted so that it can rotate freely on the chassis 19' as represented, in the case of the axle 17'c, in FIG. 8, via bearings 34, in the form of stepped rings, in which the ends of the axle 17'c are housed and which are themselves in bores of two parallel branches 19'a and 19'b of the chassis 19' which means that these bearings 34 are mounted tightly in this chassis 19'. In this mechanism, the pivoting fork 17' and the pivoting push-rod finger 31 each receive a rotational drive torque directly from the toothed output shaft 23' of the actuator 26'.

Thus, at the same time as the fork 17' is pivoted from its position in which it is disengaged from the finger 18' (FIGS. 6 and 7) into the position in which it is engaged over this finger 18' (FIGS. 10 and 11) by a movement radially from the outside inwards and towards the hub 2 and laterally towards the finger 18' and the pitch lever 8 carrying it, when the toothed output shaft 23' is rotating in the direction indicated by the arrow in FIG. 11 for one polarity at which the electric motor 25' is powered through the wire 27' coming out of the radial arm 28' of the wiring harness, the push-rod finger 31 is moved from a position away from the stop track 32 to a position close to and interacting with this stop track 32, in which position the finger 31 pushes this track 32 back via its free end 31a by pivoting radially from the inside outward by the driving of its hub 31d with teeth 31e in the direction indicated by the arrow in FIG. 11. The push-rod finger 31 thus passes from the remote position (FIGS. 6 and 7) to the position close to and interacting with the stop track 32 (FIGS. 10 and 11) and in this last position, the push-rod finger 31 pushes back the cuff 3 supporting the stop track 32 with which it interacts about the drag axis of this cuff 3 in a direction which brings the finger 18' on the pitch lever 8 of this same cuff 3 up against the bottom 17'a and between the pitch stops 17'b of the pivoting fork 17' which interacts with this finger 18'. The position in which a finger 18' is engaged in a fork 17' without a drag clearance, and with a flapping clearance, under the effect of a push-rod finger 31 pushing on the stop track 32 secured to the cuff 3 carrying this finger 18' is represented partially in FIG. 8.

Thus the four blades of the rotor are locked in terms of pitch and drag by four actuators 26' each one acting on two neighboring oscillating masses or two neighboring cuffs 3. Each actuator 26' locks an oscillating mass in terms of positive drag (that is to say drag in the direction of rotation of the rotor as indicated by the arrow Ω in FIG. 11) by pivoting a fork 17' into a position in which it is engaged over the finger 18' on the pitch lever 8 of the cuff 3 of this oscillating mass at the same time as locking this oscillating mass in terms of pitch using this same fork 17' over this same finger 18' and, at the same time, locks a neighboring oscillating mass in terms of negative drag by pivoting a push-rod finger 31 into the position in which it pushes against the drag stop track 32 of the cuff 3 of this neighboring oscillating mass.

In this example, the pivoting fork 17' has its bottom 17'a set out as a drag stop track, which comes into contact with the corresponding finger 18' in a position in which this fork 17' is engaged over this finger 18' so as to lock in terms of drag the blade 1 associated with the cuff 3 bearing this finger 18' on the side pointing towards this fork 17' and the neighboring blade 1 on this same side.

The way in which this device works is as follows: like in the previous example, the oscillating masses are preset to the pitch required for folding, either by the pilot, or by folding management software. Starting from the flight position of FIGS. 6 and 7, in which the blades are not locked either in terms of pitch or in terms of drag, rotating the electric motor 25' of each actuator 26' in one direction drives, via the reduction gearbox 24' and its toothed output shaft 23', the rotation of the fork 17' and of the push-rod finger 31 in the directions of rotation indicated by the arrows in FIG. 11 so that the oscillating masses are pushed back in terms of drag until they become locked by the push-rod finger 31 bearing against the corresponding drag stop track 32 and the other finger 18' bearing against the bottom 17'a of the corresponding pivoting fork 17'. This fork 17' positively engages the finger 18' of the pitch lever 8, locking the pitch to within the clearance allowed for flapping. As the corresponding flapping axis, which passes through the centre C of the corresponding laminated spherical stop 4 and through the centre of the articulation between the pitch rod and the corresponding pitch lever 8, is close to the fork 17' positively engaged over the finger 18', the influence of flapping on the operation of the mechanism is therefore only a minor one.

Reversing the direction of rotation of the motors 25' and of the toothed output shafts 23' will bring about the unlocking of the oscillating masses in terms of pitch and drag by disengaging the pivoting forks 17' from the fingers 18' and separating the push-rod fingers 31 from the corresponding drag stop tracks 32.

Like in the previous example, an end-of-travel positive locking or immobilizing device, possibly installed at the actuator 26', locks each of the two pivoting elements in each of their two limiting positions so as to avoid any inadvertent pivoting of these elements 17' and 31.

The loadings from the oscillating masses are, as regards stresses in terms of pitch, taken up by the forks 17' and pass through the bearings 34 of these forks 17' to the chassis 19' of the actuators 26' and are absorbed by the hub 2, whereas for the stresses in terms of flapping, these loadings are taken up by a conventional device (not represented) comprising anti-cone stops and droop-restrainer stops, the clearance of which is smaller than the working clearance given in terms of flapping by the forks 17' with the fingers 18' owing to the separation between the two pitch stops 17'b of the forks 17'. As regards stresses in terms of drag, the corresponding loadings are taken up by the bottoms 17'a of the forks 17' in terms of positive drag and by the push-rod fingers 31 in terms of negative drag, these loadings passing through the bearings 34 of these forks 17' and the push-rod fingers 31 to the chassis 19' of the actuators 26' and are also absorbed by the hub 2.

In the final position of each push-rod finger 31, the latter is no longer stressed in terms of torque, but merely in compression, and the bearings in which it rotates on the chassis 19' are stressed in shear.

As an alternative, as represented in FIG. 10, each drag stop track 32 in fact constitutes the bottom of a fork 32' thus secured to the support 16' attached laterally to each cuff 3, the fixed fork 32' having two pitch stops 32'a represented by their outline in FIG. 10, which are mutually parallel and spaced apart in such a way that the drag stop track 32 extends between them. Thus, the locking in terms of pitch can be supplemented by the two stops 32'a of the fixed fork 32' when the end 31a of the corresponding push-rod finger 31 is engaged in this fork 32' and pushes on the drag stop track 32 which constitutes the bottom of it, in order at the same time to provide locking in terms of drag.

While the position in which the oscillating masses are locked in terms of drag for the example of FIGS. 6 to 11 is being reached, substantial but temporary external loadings due to the wind, to movements of the carrier ship, etc., may be exerted on the push-rod finger 31 before it has reached its final locking position of FIGS. 10 and 11, and introduce a torque which reverses the direction. The actuator 26' needs to tolerate this reversal of direction and resume operation as soon as the temporary external loadings have passed, because locking could destroy the meshing teeth.

The third example of a locking device, described below with reference to FIGS. 12 to 22, makes it possible to get around this constraint. This third example, which makes it possible not to have to use a reversible mechanism in the event of substantial transient loadings, so as not to damage the rotational drive teeth, and which does not provide the locking in terms of pitch on just the side of the pitch lever of each blade, is represented in FIGS. 12, 13 and 20 on a rotor head very much like those of the two previous examples, which means that the same numerical references are again used to denote the same components.

In this example, the rotary elements of the two subassemblies with two elements installed between the two cuffs 3 of each pair of neighboring cuffs, are secured together and thus mounted so that they can pivot about one and the same rotation axle parallel to the axis A—A of the rotor on a chassis 39 attached laterally to the periphery of the hub 2 by four bolts 40 (see also FIGS. 14, 18, 19 and 21). The two pivoting elements secured together are produced in the form of a double-fork cranked lever 41 pivoting on the single-piece chassis 39 and receiving drive torque from the output shaft 43 of the reduction gearbox 44 of a low consumption electric motor 45 of a motor/gearbox unit of an actuator 46 bolted, like in the previous examples, to the chassis 39 (see also FIGS. 14 and 15). The double-fork cranked lever 41 has a first arm 47, which is shorter than its second arm 48, and which is set out as a first fork with a bottom 47a arranged as a drag stop track, between two roughly mutually parallel pitch stops 47b so that the fork 47 corresponds to the pivoting fork 17' of the previous example and is intended to engage on or disengage from a finger 18' mounted projecting laterally, like in the previous example, on the pitch lever 8 of one of the two cuffs 3 of the pair in question. The second arm 48 of the cranked lever 41 is set out as a second fork including two parallel pitch stops 48b spaced apart and between which a pushing roller 49 is mounted so that it can rotate about an axle 50 parallel to the axle about which the cranked lever 41 rotates on the chassis 39, and therefore also parallel to the axis of the rotor A—A. This pushing roller 49 is for example a roller with needles or rolling elements mounted so that it can rotate inside the second fork 48, in which the roller 49 is clamped by a bolt the screwed shank of which acts as an axle 50 for it, being held in the second fork 48 by a nut 51 screwed onto the axle 50 with a washer 52 inserted against the lower stop 48b.

The second fork 48 corresponds, on the one hand, via its pitch stops 48b, to the pivoting fork 21 of the first example and, on the other hand, via its rotary pushing roller 49, to the rotary push-rod finger 31 of the second example, and the second fork 48 is intended to interact with a drag stop track 53 projecting laterally, as in the previous examples, from a support 54 for the flight drag stop 15, this support 54 being attached laterally to the cuff 3 on the opposite side to the corresponding pitch lever 8. The interaction between the second fork 48 and the drag stop track 53 is twofold, because the fork 48 engages via its two pitch stops 48b on the stop track 53 to provide locking in terms of pitch, and because this track 53 is pushed back by the pushing roller 49 to provide locking in terms of drag, as explained below.

The cranked lever 41 is mounted on the chassis 39 via its cranked part so that it can pivot. For this, the cranked part of the lever 41 is formed as a cylindrical bore with straight cylindrical splines 41a (see FIG. 15) which engage with straight cylindrical splines 43a with involute flanks on the periphery of the output shaft 43 of the actuator 46 in order to centre on the flanks in the splines 41a of the cranked lever 41. The lever 41, thus driven in rotation by interaction of the splines 41a and 43a, is centered and guided in rotation in the chassis 39 using a bearing 42 which takes up load (FIGS. 15 and 17). This bearing 42 includes an axisymmetric cylindrical tubular part 42a engaged in bores opposite each other in the upper parts of the chassis 39 and of the cranked part of the lever 41, as well as a cylindrical fixing flange 42b by means of which the bearing 42 is fixed to the chassis 39 using six screws 42c. This bearing 42 is thus itself centered and clamped onto the chassis 39. The bearing 42 is furthermore equipped, at its centre, with a grease nipple 42d for lubricating the meshing splines 41a and 43a. On the opposite side to the bearing 42, the cranked part of the lever 41 is mounted in a bore of the lower branch of the chassis 39 by means of an annular collar 55 fitting snugly between the chassis 39 and the lever 41. Furthermore, the functional clearance and the heightwise position of the double-fork lever 41 can, if necessary, be adjusted in the chassis 39 by means of two calibrated or peelable shim washers 56. Each of these adjusting and sealing washers 56 has a thickened elastomeric region on its outer periphery which during assembly provides a seal, by compression, especially axial compression, between a corresponding axial end of the cranked part of the lever 41 and the corresponding upper or lower branch of the chassis 39. However, sealing may just as easily be provided in a more conventional way using O-rings or equivalent gaskets.

The interaction between the forks 47 and 48 of the cranked lever 41 and the finger 18' and the drag stop track 53 of two neighboring cuffs 3 for providing locking in terms of pitch is improved by mounting, on the finger 18' and on the drag stop track 53, two buffer blocks 57 and 58 each facing, via a buffer surface in the form of a spherical cap 57b, 58b respectively, the flat contact surface of a respective one of the two pitch stops 47b or 48b of the first fork 47 or of the second fork 48 of the cranked lever 41 as represented diagrammatically in FIG. 22. The spherical blocks 57 and 58 make it possible to maintain a point contact between the spherical surfaces 57b and 58b and the flat surfaces of the stops 47b or 48b irrespective of the pitch (restricted) and flapping. The pitch is therefore locked by flat/spherical contacts between the stops 47b or 48b of the fork 47 or 48 and the spherical buffer surfaces 57b and 58b of the buffer blocks 57 and 58, these surfaces being hardened and of a relatively large spherical radius. One 57 of the two blocks has an internally tapped annular shank 57a engaged through an aperture made in the finger 18' or in the drag stop track 53, and the other block 58 has a threaded shank 58a which screws into the tapped bore of the block 57 so that the two blocks 57 and 58 are in contact with the finger 18' or the track 53 carrying them around this aperture, through which the two blocks are screwed together. In addition, the two blocks are captive because they are joined together by a locking wire 59 preventing them from becoming unscrewed and which passes through a hole formed in the finger 18' or the stop track 53 which supports the blocks 57 and 58 (see FIG. 22).

In this device, locking in terms of pitch and drag is provided by four actuators 46 each acting on two neighboring oscillating masses. One actuator 46, by the rotation of its output shaft 43 in an appropriate direction, controls the pushing by the roller 49 of a cuff 3 and of the associated oscillating mass which carries the corresponding drag stop track 53, from its stationary position, after the rotor has stopped rotating, until the drag stop 14 of this same cuff 3, that is to say the drag stop 14 borne by its pitch lever 8, comes into contact with the drag stop 12 opposite on the hub 2, and this oscillating mass is held in this position by the roller 49 being kept pressed against the drag stop track 53. At the same time, the pitch of this oscillating mass is locked by engagement of the drag stop track 53 and of its buffer blocks 57 and 58 between the pitch stops 48b of the second fork 48 of the cranked lever 41. At the same time too, the other fork 47 of this lever 41 has its pitch stops 47b engaged over each side of the finger 18' and of its blocks 57 and 58 for locking the pitch of the corresponding oscillating mass which has the pitch lever 8 which supports this finger 18'.

FIGS. 12, 18 and 19 represent the device in the unlocked position or flight configuration, in which the two forks 47 and 48 of the cranked lever 41 are disengaged from the finger 18' and from the drag stop track 53 with which they interact, and FIGS. 13, 20 and 21 represent the device in the position for locking the blades in terms of pitch and drag, as described above.

After the rotor has stopped and before the blades have folded, the oscillating masses are preset to the pitch required for folding by the pilot or by the folding management software. Rotating the electric motors 45 in one direction, via the reduction gearboxes 44, causes the double-fork cranked levers 41 to pivot and via their roller 49 push back the oscillating masses until they come into contact with the drag stops 12 of the hub 2 via their drag stop 14 of their pitch lever 8, if they were not already in this position when the rotor stopped. At the same time, in accomplishing their pivoting travel indicated by an arc of a circle in FIG. 16, the double-fork cranked levers 41 on the one hand trap the finger 18' with its blocks 57, 58 on the pitch lever 8 of an oscillating mass, possibly with a certain amount of clearance of 3 mm for example up and down and, on the other hand, trap the drag stop track 53 with its blocks 57 and 58 on the neighboring oscillating mass, locking or restricting the pitch with an angular clearance of less than ±1°. Each oscillating mass is locked in terms of drag on the one hand by the roller 49 pressing against the drag stop track 53 on one side of its longitudinal axis X—X and, on the other side of this axis X—X, by the drag stop 14 of the oscillating mass pressing against the drag stop 12 of the hub 2.

When pitch and drag are being unlocked, reversing the direction of rotation of the motors 45 causes the forks 47 and 48 of the pivoting cranked levers 41 to disengage and therefore releases the oscillating masses.

As in the previous examples, positive locking or immobilizing devices may be provided for the end-of-travel of each pivoting cranked lever 41.

The loadings from the oscillating masses are, in the case of stresses in terms of pitch, taken up by the double-fork levers 41 and pass through the bearings and the chassis 39 for the actuators 46 to be absorbed by the hub 2. As regards stresses in terms of drag, the loadings are taken up by the rollers 49 of the double-fork levers 41 in terms of negative drag (in the opposite direction to the direction of rotation Ω of the rotor, indicated in FIG. 12) and by the drag stops 12 of the hub 2 in terms of positive drag, the loadings taken up by the rollers 49 of the levers 41 passing through their bearings and the chassis 39 to be absorbed by the hub 2.

We claim:

1. A locking device for locking blades of a helicopter rotor, at least in terms of pitch, the rotor being of the type comprising:

a hub driven in rotation about an axis of the rotor;

at least two blades, each of which is connected to the hub by a linking member, said linking member positioned radially with respect to the axis of the rotor and connected to the hub by retaining and articulating means, the linking member being secured to the corresponding blade, said linking member and corresponding blade constituting an oscillating mass with respect to angular movements in pitch, flap and drag; and the locking device comprising: for each blade, at least one first subassembly with a fork for locking a finger, in which subassembly the two elements that are the finger and the fork are, firstly, one mounted on the hub and the other mounted on the corresponding linking member and, secondly, able to move with respect to each other and be moved from one of two positions to the other of said positions, one of these positions being a position in which the finger is engaged in the fork to lock said oscillating mass, at least in terms of pitch, and the other of said positions being a position in which the finger is disengaged from the fork to allow the movements of said oscillating mass, at least in terms of pitch, wherein said first subassembly is positioned laterally with respect to the hub, between the linking members of two adjacent blades of the rotor, one of the two elements of said first subassembly being fixed to the linking member of a first of the two adjacent blades, said one of the two elements of said first subassembly projecting laterally from one side of said linking member and extending towards the linking member of the second of the two adjacent blades, and the other element of said first subassembly being mounted to rotate with respect to the hub about a rotation axle about which said other element pivots from one of said disengaged and engaged positions to the other of said disengaged and engaged positions.

2. The locking device according to claim 1, wherein said element fixed to the linking member of said first blade is an element secured to a pitch lever of said first blade, said pitch lever being attached to the linking member of said first blade.

3. The locking device according to claim 1, wherein said element that rotates with respect to the hub is mounted to pivot about its rotation axle, said axle substantially parallel to the rotor axis on a chassis attached laterally to the periphery of said hub.

4. The locking device according to claim 1, wherein said element fixed to the linking member of said first blade is the finger of said first subassembly, and said element that rotates with respect to the hub is the fork of said first subassembly.

5. The locking device according to claim 1, wherein a device immobilizes said element that rotates with respect to the hub in the position in which the finger is either engaged in and/or disengaged from the fork of said first subassembly.

6. The locking device according to claim 1, wherein at least one reversible actuator which rotates as one with the hub is connected by a transmission system to the rotary element of said at least one first subassembly.

7. The locking device according to claim 3, comprising reversible actuators of which there are the same number as there are blades of the rotor, and each of which is fixed laterally to the periphery of the hub between the linking members of two adjacent blades of the rotor, each actuator drives the rotation said element that rotates of said first subassembly with said fork and said finger which is arranged between said linking members of the two adjacent blades.

8. The locking device according to claim 7, wherein each actuator is mounted on said chassis attached laterally on the periphery of the hub in-close proximity to said element that rotates with respect to the hub of the first subassembly, said actuator including an output member, driving the rotation of said element that rotates with respect to the hub.

9. The locking device according to claim 1, further comprising, between the linking members of said adjacent first and second blades of the rotor, and laterally with respect to the hub, a second subassembly comprising two elements which can move with respect to each other, one of said two elements of said second assembly being fixed to the linking member of said second blade, said one of said two elements of said second assembly projecting laterally from one side of said linking member of said second blade and extending towards said linking member of said first blade, and the other of said two elements of said second assembly mounted to rotate with respect to the hub and pivoting about a rotation axle between two positions, one of said two positions being a position close to and interacting with the element fixed to the linking member of said second blade and the other of said two positions separated from the element fixed to the linking member of said blade.

10. The locking device according to claim 9, wherein the element of the second subassembly which is fixed to linking member of the second blade is an element secured to a support for a drag stop of said second blade, said support for a drag stop being attached to said linking member of said second blade.

11. The locking device according to claim 9, wherein said element that rotates with respect to the hub of the second subassembly is an element mounted to pivot about its rotation axle, said axle substantially parallel to the axis of the rotor on a chassis attached laterally to the periphery of the hub.

12. The locking device according to claim 9, wherein the elements that rotate with respect to the hub of said first subassembly and of said second subassembly are arranged between the linking members of said two adjacent blades, and wherein the elements that rotate with respect to the hub of said first assembly and said second assembly are linked in terms of rotation, wherein the elements that rotate can simultaneously and respectively be in one of two positions, one position being where the elements that rotate are engaging with and close by and interacting with the corresponding elements fixed on said linking members, the other positioning being disengaged and separated from the corresponding elements fixed on said linking members in order simultaneously to lock and unlock said blades.

13. The locking device according to claim 12, wherein one of the elements that rotate is driven in rotation by an actuator and drives the rotation of the other element that rotates.

14. The locking device according to claim 12, wherein each of the two elements that rotate is driven in rotation directly by the same actuator.

15. The locking device according to claim 1, wherein said element that rotates of said first subassembly of the device comprises a hub which is at least partially toothed, driven in rotation by an output pinion of a reduction gearbox of a reversible electric motor/gearbox unit of a rotary operating actuator.

16. The locking device according to claim 1, wherein said element that rotates of said first subassembly is pinned to its rotation axle and mounted to rotate freely in at least one bearing on a chassis attached laterally to the hub of the rotor.

17. The locking device according to claim 9, wherein said second subassembly comprises a second fork for locking a second finger, and said close by and interacting position and said separated position are positions in which said second finger is respectively engaged in and disengaged from said second fork, the element of said second subassembly which is fixed to the linking member of said second blade being the second finger, and the rotary element of the second subassembly being the second fork.

18. The locking device according to claim 1, wherein said fork has a bottom between two pitch stops which are substantially parallel and spaced apart along the rotation axle of said rotary element so that in the position of engagement with a corresponding finger, said finger defines with said bottom a working drag clearance for at least one blade of the rotor which drag clearance is substantially perpendicular to said rotation axle and to a longitudinal pitch-change axis of the corresponding oscillating mass.

19. The locking device according to claim 1, wherein said element that rotates moves respectively from said position in which it is disengaged or separated from said other element into said position in which it is engaged in or close to and interacting with said other element fixed to said linking member by pivoting in the radial direction inwards toward the hub, and in the circumferential direction with respect to the axis of the rotor towards said linking member.

20. The locking device according to claim 9, wherein said element that rotates of the second subassembly is a push-rod finger and in the position in which said element that rotates is close to and interacting with said element fixed to the linking member of said second blade, said element that rotates is in contact with said element fixed to the linking member in order to lock said second blade in terms of drag in the direction pointing towards the first blade.

21. The locking device according to claim 20, wherein said push-rod finger moves from said position separated from said element fixed to the linking member of the second blade into said interacting position in which said push-rod finger pushes said element fixed to the linking member, said push-rod finger pivoting substantially outward in a radial direction with respect to the axis of the rotor.

22. The locking device according to claim 20, wherein the fork of said corresponding first subassembly includes a bottom, wherein said bottom is utilized as a drag stop when contact with said finger of said first subassembly in the position in which said fork is engaged over said finger so as to lock said first blade in terms of drag on the side pointing towards said second blade.

23. The locking device according to claim 20, wherein said element of said second subassembly which is fixed to the linking member of said second blade is a fork, wherein said fork of said second subassembly includes a bottom which is utilized as a drag stop when in contact with the push-rod finger in the engaged and interacting position, and wherein said push-rod finger extends between two pitch stops of said fork, whereby said second blade is simultaneously locked in terms of pitch and drag towards said first blade.

24. The locking device according to claim 9, wherein said elements that rotate of said first and second subassemblies are mounted so as to pivot about the same rotation axle.

25. The locking device according to claim 24, wherein said elements that rotate of said first and second assemblies are secured to one another.

26. The locking device according to claim 25, wherein said elements that rotate of the first and second subassemblies each consist of a respective one of two arms of a cranked lever pivoting at its crank on a chassis attached to the hub.

27. The locking device according to claim 26, wherein said cranked lever includes a first arm comprising a fork, said fork constituting the element that rotates of the first subassembly and interacting with said finger fixed on the linking member of the first of said adjacent blades thereby locking said first blade in terms of pitch, a second arm of the cranked lever comprises an arm which is longer than the first arm and includes a pushing roller, said pushing roller interacting with a drag stop track of said second blade to push against said track, said drag stop track constituting the element of said second subassembly which is fixed to the linking member of said second blade so as to press the drag stop of said linking member against a drag stop of the hub in order to lock said second blade in terms of drag.

28. The locking device according to claim 27, wherein said pushing roller is a rotating roller mounted so that it can rotate on said second arm about an axle which is substantially parallel to the axle about which the cranked lever rotates.

29. The locking device according to claim 28, wherein said cranked lever comprises a double pivoting fork, wherein said second arm comprises a second fork, said second fork including two pitch stops spaced apart, wherein said pushing roller is positioned between said two pitch stops and is mounted to rotate, said drag stop track engages with said second fork in the position in which said drag stop track interacts with said pushing roller so as to lock said second blade also in terms of pitch.

30. The locking device according to claim 29, wherein said double-fork cranked lever is centered and guided in rotation in a bearing for taking up loading, this bearing being centered and clamped on said chassis attached to the hub.

31. The locking device according to claim 30, wherein said double-fork cranked lever includes a crank part, said crank lever include at the crank part a bore with straight and cylindrical internal splines via which said lever is driven in rotation by an output member, said output member comprising straight and cylindrical external splines on an output shaft of a reduction gearbox of an actuator, said bearing for guiding and centering the cranked lever being equipped with a grease nipple for lubricating said splines.

32. The locking device according to claim 29, wherein positioned on at least one of said elements of the first and second subassemblies which are fixed to the linking members of the two adjacent blades, are two buffer blocks each facing a respective one of the two pitch stops of said first or second fork of the cranked lever.

33. The locking device according to claim 32, wherein the two buffer blocks are positioned around an aperture made in said element which bears said buffer blocks and through which the two blocks are screwed together.

34. The locking device according to claim 32, wherein each buffer block includes a buffer surface in the form of a spherical cap facing a flat contact surface of the corresponding pitch stop on said first or second fork.

35. The locking device according to claim 32, wherein each of the buffer blocks is captive and connected by a locking wire preventing said buffer blocks from becoming disconnected from said element which bears said buffer blocks.

36. The locking device according to claim 1, wherein said element fixed to the linking member of said first blade is an element secured to a support for a drag stop of said first blade, said support for a drag stop being attached to the linking member of said first blade.

37. The locking device according to claim 9, wherein the element of the second subassembly which is fixed to linking member of the second blade is an element secured to a pitch lever of said second blade, said pitch lever being attached to said linking member of said second blade.

38. The locking device according to claim 1, wherein said fork has a bottom between two pitch stops which are substantially parallel and spaced apart along the rotation axle of said rotary element so that in the position of engagement with a corresponding finger, said finger defines, with said pitch stops, a working flap clearance for at least one corresponding blade and which is substantially parallel to said rotation axle.

* * * * *